(12) United States Patent
Lepper et al.

(10) Patent No.: US 11,859,749 B2
(45) Date of Patent: Jan. 2, 2024

(54) SEALED PASS-THROUGH GROMMET SYSTEM AND METHOD

(71) Applicant: Illinois Tool Works Inc., Glenview, IL (US)

(72) Inventors: Mark Owen Lepper, Oak Park, IL (US); Eric David Kendall, Rochester Hills, MI (US)

(73) Assignee: Illinois Tool Works Inc., Glenview, IL (US)

( * ) Notice: Subject to any disclaimer, the term of this patent is extended or adjusted under 35 U.S.C. 154(b) by 559 days.

(21) Appl. No.: 16/773,467

(22) Filed: Jan. 27, 2020

(65) Prior Publication Data

US 2020/0263811 A1    Aug. 20, 2020

Related U.S. Application Data

(60) Provisional application No. 62/932,712, filed on Nov. 8, 2019, provisional application No. 62/912,766, filed
(Continued)

(51) Int. Cl.
*F16L 5/02* (2006.01)
*F16L 5/10* (2006.01)
(Continued)

(52) U.S. Cl.
CPC .............. *F16L 5/027* (2013.01); *F16L 5/10* (2013.01); *B60R 16/0222* (2013.01); *H02G 3/22* (2013.01)

(58) Field of Classification Search
CPC ........ F16L 5/027; F16L 5/10; B60R 16/0222; H02G 3/22; H02G 3/0468
See application file for complete search history.

(56) References Cited

U.S. PATENT DOCUMENTS

| 5,144,777 A | * | 9/1992 | Fishel | ..................... E04F 21/00 52/220.8 |
| 5,537,714 A | * | 7/1996 | Lynch, Jr. | ........... B60R 16/0222 411/182 |

(Continued)

FOREIGN PATENT DOCUMENTS

| CN | 102742106 A | 10/2012 |
| CN | 103162037 A | 2/2015 |

(Continued)

OTHER PUBLICATIONS

Office Action for corresponding German Patent Application No. 10 2020 104 199.3, dated Oct. 19, 2022 (9 pages).

(Continued)

*Primary Examiner* — James M Hewitt, II
(74) *Attorney, Agent, or Firm* — Quarles & Brady LLP

(57) ABSTRACT

A grommet assembly is configured to be installed within an opening and includes a grommet, a primary seal, and a lock ring. The grommet includes a platform, a panel portion extending from a first surface, and a ring portion extending from a second surface. The ring portion defines a passageway extending through the grommet and includes a plurality of grommet clamping features arranged around the ring portion. The primary seal extends around a periphery of the grommet. The lock ring includes a central hub having a plurality of ring clamping features arranged around the central hub. The displacement of the lock ring relative to the grommet engages each one of the plurality of ring clamping features with a corresponding one of the plurality of grommet clamping features to fasten the lock ring to the grommet to form a secondary seal between the grommet and the lock ring.

19 Claims, 30 Drawing Sheets

Related U.S. Application Data on Oct. 9, 2019, provisional application No. 62/841,975, filed on May 2, 2019, provisional application No. 62/814,944, filed on Mar. 7, 2019, provisional application No. 62/807,430, filed on Feb. 19, 2019.

(51) Int. Cl.
*H02G 3/22* (2006.01)
*B60R 16/02* (2006.01)

(56) References Cited

U.S. PATENT DOCUMENTS

| | | | |
|---|---|---|---|
| 6,303,869 | B1 | 10/2001 | Shanahan et al. |
| 9,365,170 | B2 * | 6/2016 | Gronowicz, Jr .... B60R 16/0222 |
| 2009/0065235 | A1 | 3/2009 | Uchibori |
| 2012/0325549 | A1 * | 12/2012 | Schlegel ............. H02G 3/0675 |
| | | | 174/652 |
| 2014/0167412 | A1 | 6/2014 | Magnone |
| 2016/0123511 | A1 | 5/2016 | Khan et al. |
| 2018/0145492 | A1 * | 5/2018 | Naumann ................ H02G 3/22 |
| 2019/0211929 | A1 | 7/2019 | Chlystek et al. |
| 2019/0360587 | A1 | 11/2019 | Chlystek et al. |

FOREIGN PATENT DOCUMENTS

| | | |
|---|---|---|
| DE | 102010027445 B3 | 12/2011 |
| DE | 102015117600 A1 | 5/2016 |
| GB | 8421013 | 9/1984 |
| JP | H09129067 A | 5/1997 |
| JP | H1155831 A | 2/1999 |
| JP | 2002159121 A | 5/2002 |
| JP | 2017158355 A | 9/2017 |
| JP | 2018057064 A | 4/2018 |

OTHER PUBLICATIONS

Office Action for corresponding Chinese Patent Application No. 202010100124.2, dated Dec. 5, 2022.
Office Action for corresponding Chinese Patent Application No. 202010100124.2, dated Jul. 18, 2023.

* cited by examiner

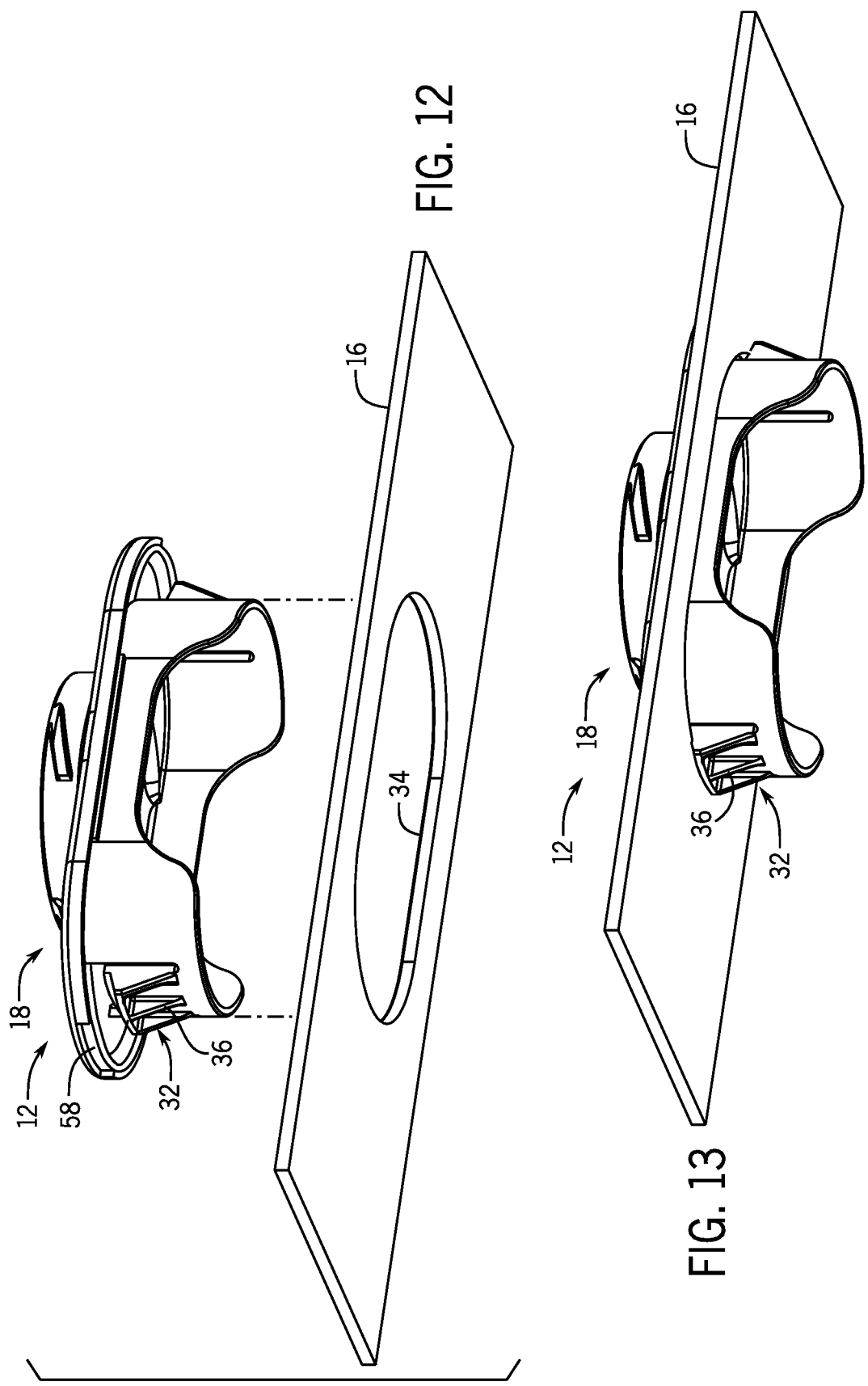

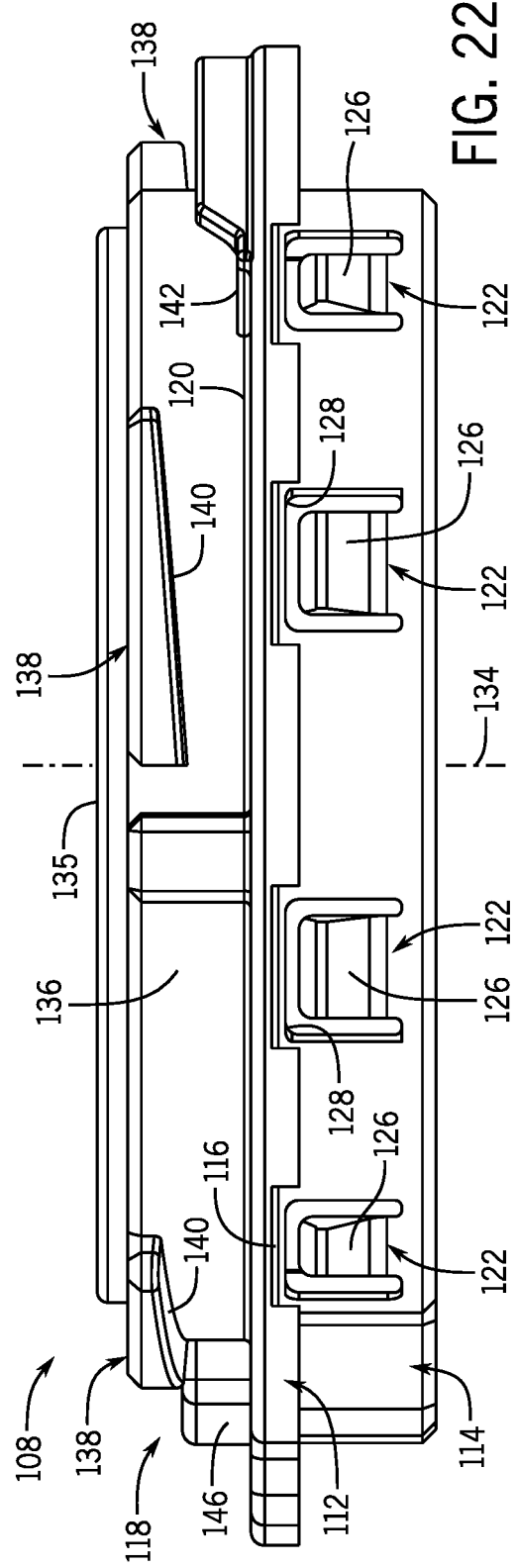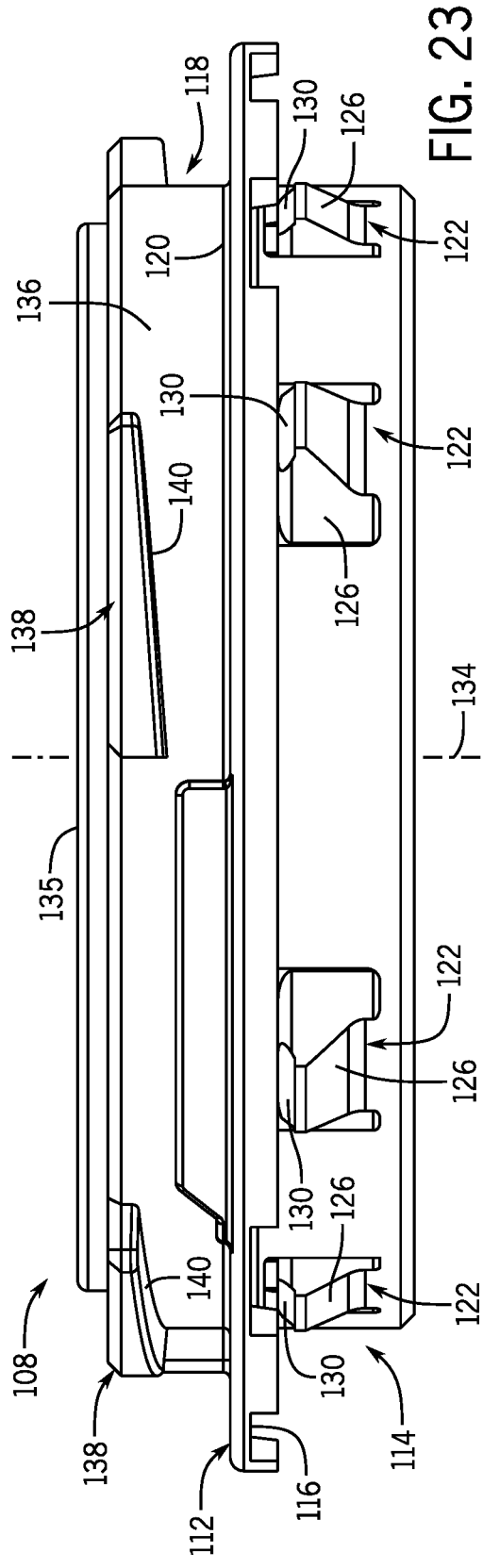

SEALED PASS-THROUGH GROMMET SYSTEM AND METHOD

CROSS-REFERENCES TO RELATED APPLICATIONS

The present application is based on and claims priority to U.S. Provisional Patent Application No. 62/807,430 filed on Feb. 19, 2019, U.S. Provisional Patent Application No. 62/814,944 filed on Mar. 7, 2019, U.S. Provisional Patent Application No. 62/841,975 filed on May 2, 2019, U.S. Provisional Patent Application No. 62/912,766 filed on Oct. 9, 2019, and U.S. Provisional Patent Application No. 62/932,712 filed on Nov. 8, 2019, each of which is incorporated herein my reference in its entirety.

STATEMENT REGARDING FEDERALLY SPONSORED RESEARCH

Not Applicable.

BACKGROUND

Generally, grommets may be inserted into an opening formed in a structure. The grommet may provide a passageway through which a component, or a bundle of components, (e.g., wire, chord, rope, or any other material) may be routed to pass through the structure.

BRIEF SUMMARY

In one embodiment, the present disclosure provides a grommet assembly configured to be installed through an opening. The grommet assembly includes a grommet having a platform, a panel portion extending from a first surface of the platform, and a ring portion extending from a second surface of the platform. The ring portion defines a passageway extending through the grommet and includes a plurality of grommet clamping features arranged around the ring portion. The grommet assembly further includes a primary seal extending around a periphery of the grommet, and a lock ring having a central hub with a plurality of ring clamping features arranged around the central hub. Selective displacement of the lock ring relative to the grommet in a first direction is configured to engage each one of the plurality of ring clamping features with a corresponding one of the plurality of grommet clamping features to fasten the lock ring to the grommet and to form a secondary seal between the grommet and the lock ring.

In one embodiment, the present disclosure provides grommet assembly configured to be installed within an opening. The grommet assembly includes a grommet having a platform, a panel portion extending from a first surface of the platform, and a ring portion extending from a second surface of the platform. The platform includes and an aperture arranged on and extending at least partially through the platform. The ring portion defines a passageway extending through the grommet and includes a plurality of grommet clamping features arranged around the ring portion. The grommet assembly further includes a lock ring having a protrusion and a central hub with a plurality of ring clamping features arranged around the central hub. Selective displacement of the lock ring relative to the grommet in a first direction is configured to engage each one of the plurality of ring clamping features with a corresponding one of the plurality of grommet clamping features to fasten the lock ring to the grommet. When the lock ring is displaced relative to the grommet, the protrusion is configured to snap into the aperture to provide an indication that the lock ring is fastened to the grommet.

In one embodiment, the present disclosure provides grommet assembly configured to be installed within an opening. The grommet assembly includes a grommet having a platform, a panel portion extending from a first surface of the platform, and a ring portion extending from a second surface of the platform. A protrusion is arranged on and extends from the platform. The ring portion defines a passageway extending through the grommet and includes a plurality of grommet clamping features arranged around the ring portion. The grommet assembly further includes a primary seal extending around a periphery of the grommet and a lock ring having a locking flange or tab and a central hub with a plurality of ring clamping features arranged around the central hub. Selective displacement of the lock ring relative to the grommet in a first direction is configured to engage each one of the plurality of ring clamping features with a corresponding one of the plurality of grommet clamping features to fasten the lock ring to the grommet and form a secondary seal between the lock ring and the grommet. The locking flange or tab is configured to, upon displacement of the lock ring relative to the grommet, flex relative to the platform to provide an indication that the lock ring is fastened to the grommet.

The foregoing and other aspects and advantages of the disclosure will appear from the following description. In the description, reference is made to the accompanying drawings, which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

FIG. 12 is an exploded bottom, front, right isometric view of a grommet and a panel of the sealed pass-through grommet system of FIG. 1;

FIG. 13 is a bottom, front, right isometric view of the grommet and the panel of FIG. 12 with the grommet installed onto the panel;

FIG. 22 is a front view of the grommet of FIG. 21;

FIG. 23 is a left side view of the grommet of FIG. 21;

DETAILED DESCRIPTION

Figure 1:
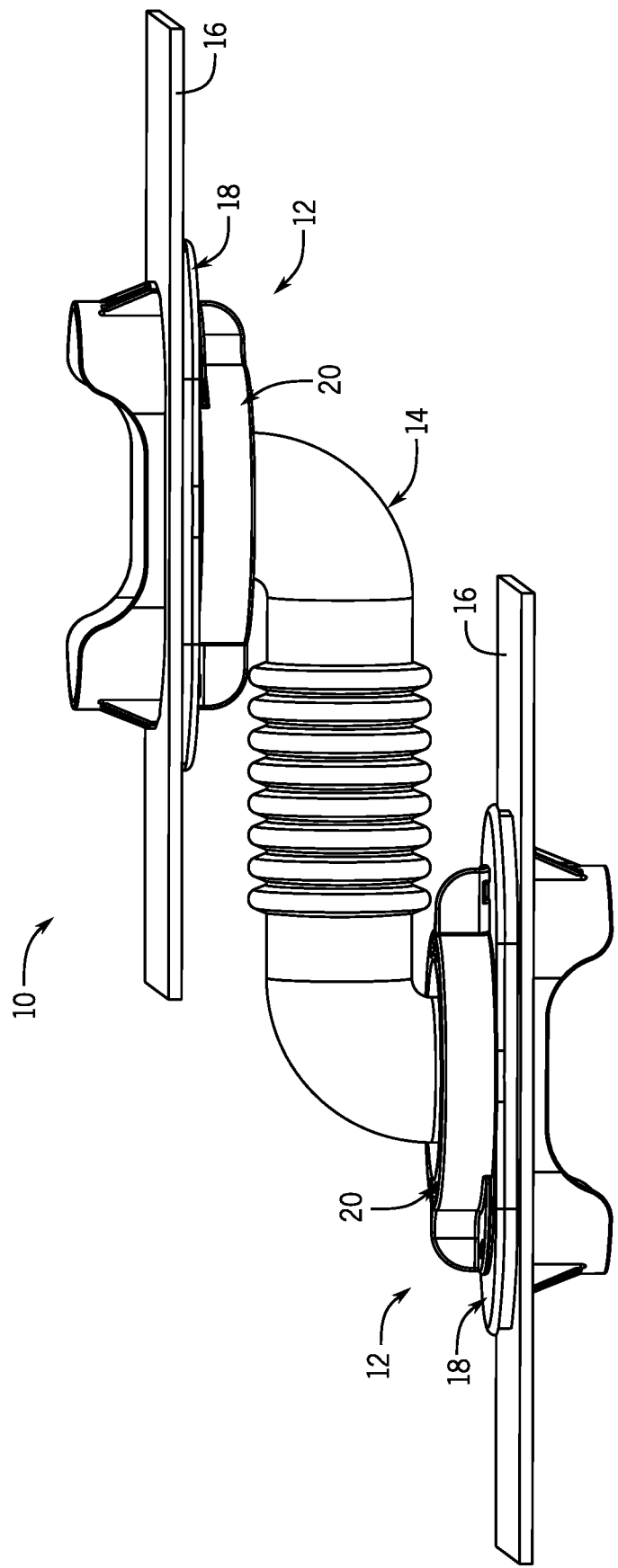
FIG. 1 is a top, front, left isometric view of a sealed pass-through grommet system according to the present disclosure.
Figure 2:
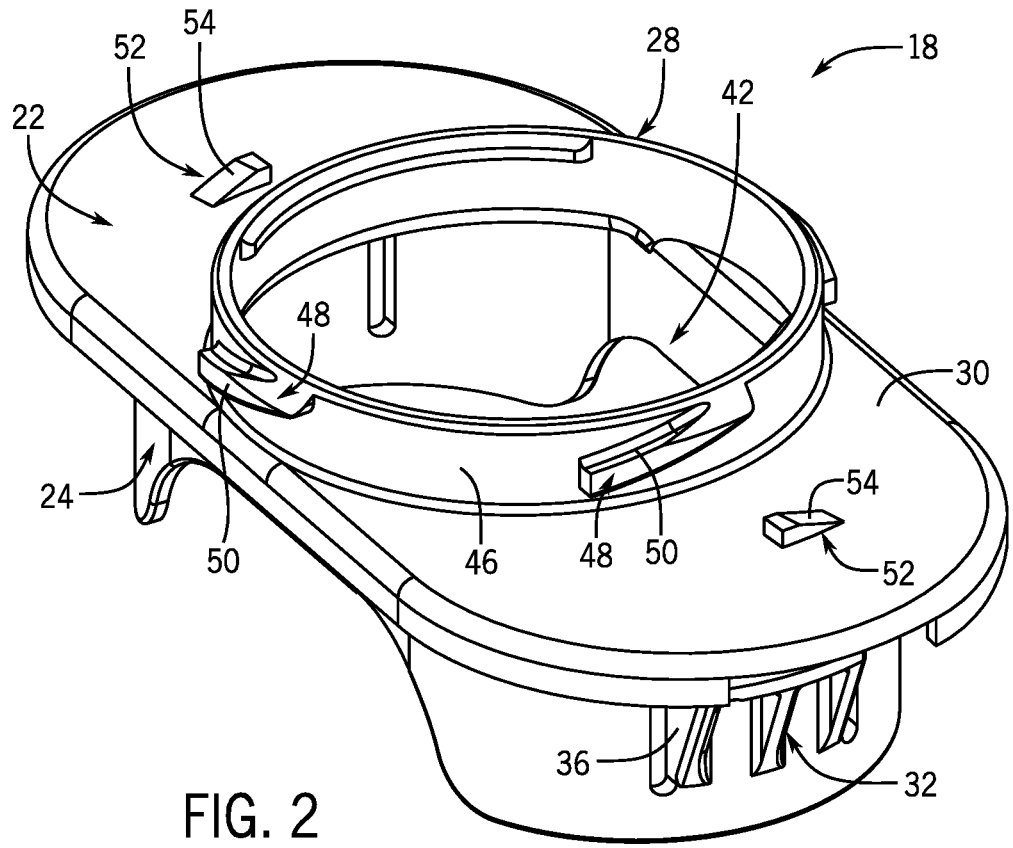
FIG. 2 is a top, front, left isometric view of a grommet of the of FIG. 2.
Figure 3:
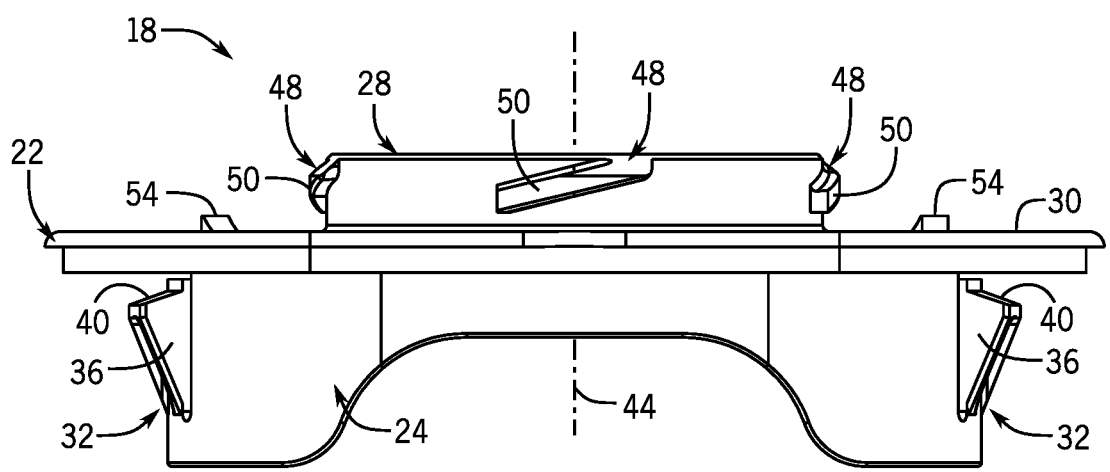
FIG. 3 is a front view of the grommet of FIG. 2.
Figure 4:
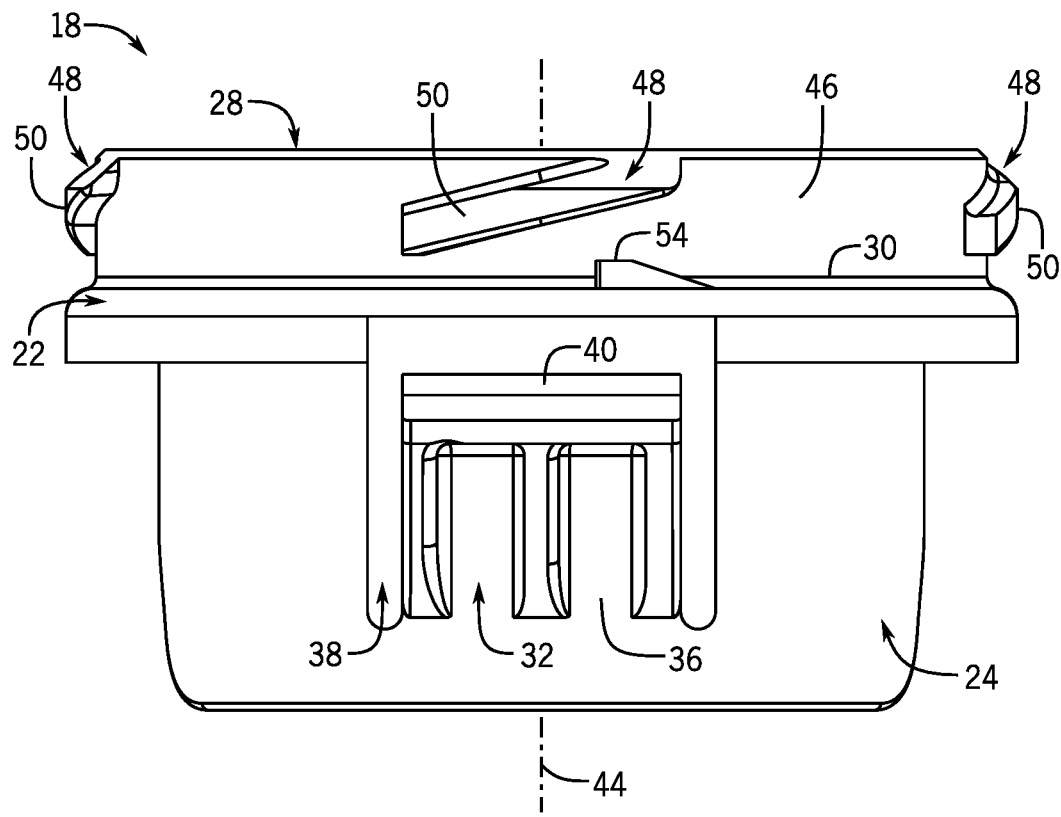
FIG. 4 is a left side view of the grommet of FIG. 2.
Figure 5:
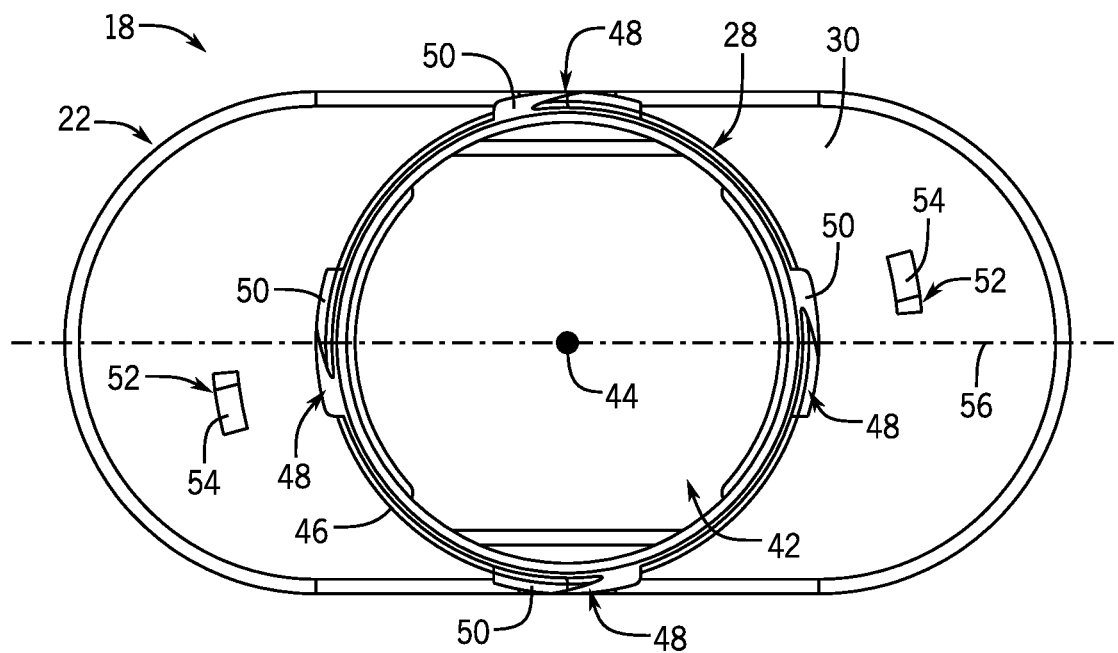
FIG. 5 is a top plan view of the grommet of FIG. 2.

The use herein of the term "axial" and variations thereof refers to a direction that extends generally along an axis of symmetry, a central axis, or an elongate direction of a particular component or system. For example, an axially-extending structure of a component may extend generally along a direction that is parallel to an axis of symmetry or an elongate direction of that component. Similarly, the use herein of the term "radial" and variations thereof refers to directions that are generally perpendicular to a corresponding axial direction. For example, a radially extending structure of a component may generally extend at least partly along a direction that is perpendicular to a longitudinal or central axis of that component. The use herein of the term "circumferential" and variations thereof refers to a direction that extends generally around a circumference or periphery of an object, around an axis of symmetry, around a central axis, or around an elongate direction of a particular component or system.

Conventional grommet systems typically connect to a routing element (e.g., a conduit, a boot, or any other component that may receive one or more components therein) and include a fastener that is designed such that the routing element is required to be stretched over the fastener prior to assembly to a structure (e.g., a panel, or another structure having an opening through which the grommet system may facilitate passage of the routing element and the components received within the routing element). The process of stretching the routing element over the fastener in conventional grommet systems is burdensome from a manufacturing perspective and requires increased time and cost for manufacturers.

In general, conventional grommet systems may include a seal to facilitate forming a sealed passageway through a structure (e.g., an opening in a panel) for the routing element and the components received therein. With the routing element being stretched over the fastener, convention grommet systems require substantial compressive force during installation to compress the seal prior to engaging the fastener. In addition, conventional grommet systems fail to provide an indication that the seal has been completely compressed and that the fasteners is completely installed/locked.

The present disclosure overcomes these deficiencies by providing a grommet assembly that is easily installed through a structure and forms a sealed passageway for a routing element via a simplified installation process that requires less force, when compared with conventional grommet systems. For example, a grommet system according to the present disclosure may include a primary seal and a secondary seal that combine to provide a sealed passageway through the structure and the routing element. In some embodiments, the grommet system may include a grommet and a lock ring that is configured to couple to the grommet. The lock ring may be coupled to the grommet, for example, via an input displacement (e.g., rotation) being applied to the lock ring, which, in turn, fastens the lock ring to the grommet and compresses the routing element between the grommet and the lock ring to form the secondary seal. In some embodiments, the grommet and/or the lock ring may include an indicator that is configured to provide a haptic, visual, and/or audible indication that the lock ring is completely fastened to the grommet, which also indicates that the secondary seal is formed.

FIG. 1 illustrates a sealed pass-through grommet system 10 according to one aspect of the present disclosure. In the illustrated embodiment, the grommet system 10 includes a pair of grommet assemblies 12 arranged on opposing ends of a conduit 14. Each of the grommet assemblies 12 provides a sealed passageway through a panel 16 and the conduit 14, which enables, for example, wiring components to be routed through the panels 16, the conduit 14, and the grommet assemblies 12. Each of the grommet assemblies 12 includes the same components, therefore, one of the grommet assemblies 12 will be described with reference to the following figures.

The grommet assembly 12 includes a grommet 18 and a lock ring 20 configured to be selectively fastened to the grommet 18. As illustrated in FIGS. 2-6, the grommet 18 includes a platform 22, a panel portion 24 extending from a first surface 26 of the platform 22, and a ring portion 28 extending from a second surface 30 of the platform 22. In the illustrated embodiment, the panel portion 24 and the ring portion 28 extend from the platform 22 in opposing directions (e.g., axially away from one another).

The panel portion 24 extends axially away from the first surface 26 (see FIG. 6) and defines a generally oval shape. The panel portion 24 is generally hollow and includes a pair of panel retention features 32 arranged on laterally-opposing ends (e.g., a left end and a right end from the perspective of FIG. 3) of the panel portion 24. In general, the panel retention features 32 are configured to selectively engage an opening 34 in the panel 16 (see FIG. 12) and retain the grommet 18 within the opening 34.

In the illustrated embodiment, the panel retention features 32 include a pair of retention arms 36. The retention arms 36 are arranged within a cutout 38 that extends partially around a periphery of each of the retention arms 36. For example, one edge of each of the retention arms 36 is formed integrally with, or attached to, the panel portion 24 and the remaining edges are free-floating (e.g., not in contact) with respect to the panel portion 24 due to the cutout 38. In this way, for example, the retention arms 36 may flex laterally with respect to the panel portion 24 (e.g., toward and away from one another, or left to right from the perspective of FIG. 3). In the illustrated embodiment, each of the retention arms 36 includes a ramped surface 40 that, when the panel portion 24 is inserted into the opening 34 of the panel 16, is configured to engage the edge of the opening 34 to retain the grommet 18 within the opening 34 and prevent the grommet 18 from displacing axially relative to the opening 34.

The ring portion 28 extends axially away from the second surface 30 (e.g., a top surface from the perspective of FIG. 2) and defines a generally annular shape. The ring portion 28 defines a passageway 42 that extends axially through the grommet 18 along a center axis 44. The passageway 42 enables components (e.g., wires, wire bundles, cables, connectors, etc.) to be inserted through the grommet 18. The ring portion 28 includes an outer surface 46 having a plurality of grommet clamping features 48 arranged around the outer surface 46. For example, in the illustrated embodiment, the ring portion 28 includes four grommet clamping features 48 arranged circumferentially around the outer surface 46 in equally-spaced increments. In some embodiments, the ring portion 28 may include more or less than four grommet clamping features 48 spaced circumferentially around the outer surface 46 in any increment. In the illustrated embodiment, each of the grommet clamping features 48 defines a generally helical protrusion 50 that extends radially outwardly from the outer surface 46 and is angled helically relative to the center axis 44. That is, each of the grommet clamping features 48 defines a helical path as it extends circumferentially along the outer surface 46.

The second surface 30 of the platform 22 includes one or more ring retention features 52. In the illustrated embodiment, the second surface 30 of the platform 22 includes a pair of ring retention features 52 arranged on laterally-opposing sides of the second surface 30. In the illustrated embodiment, the ring retention features 52 each define a ramped tab 54 that protrudes axially away from the first surface 26. The ramped tabs 54 are rotationally offset from a centerline 56 that extends longitudinally through a center of the grommet 18 (see FIG. 5). For example, one of the ramped tabs 54 is arranged on one side of the centerline 56 and another of the ramped tabs 54 is arranged on an opposing side of the centerline 56. In some embodiments, the grommet 18 may include more or less than two ramped tabs 54 that are arranged at any location along the second surface 30.

Figure 6:
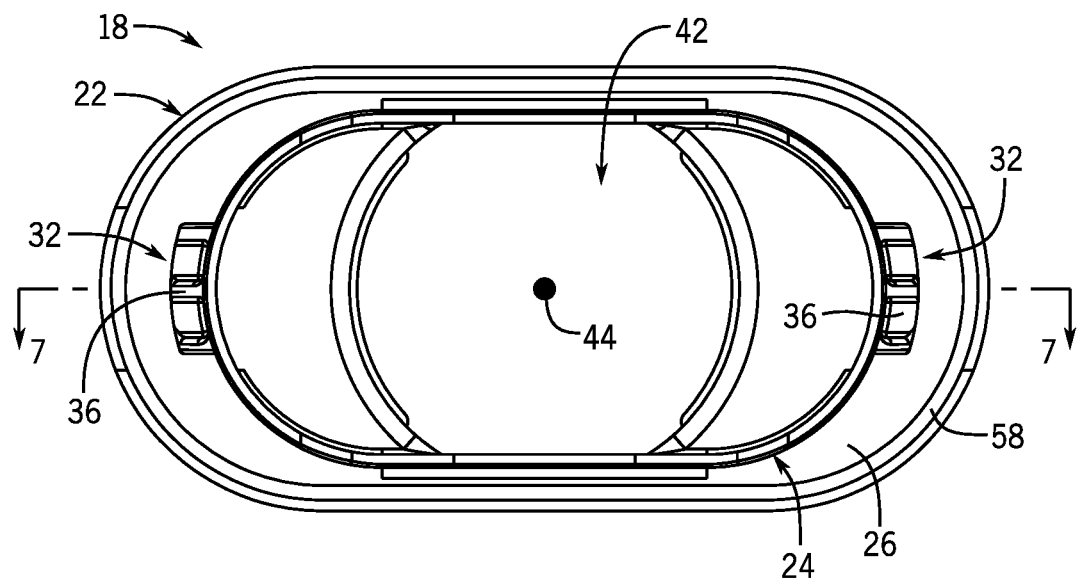
FIG. 6 is a bottom plan view of the grommet of FIG. 2 assembled to a seal.
Figure 7:
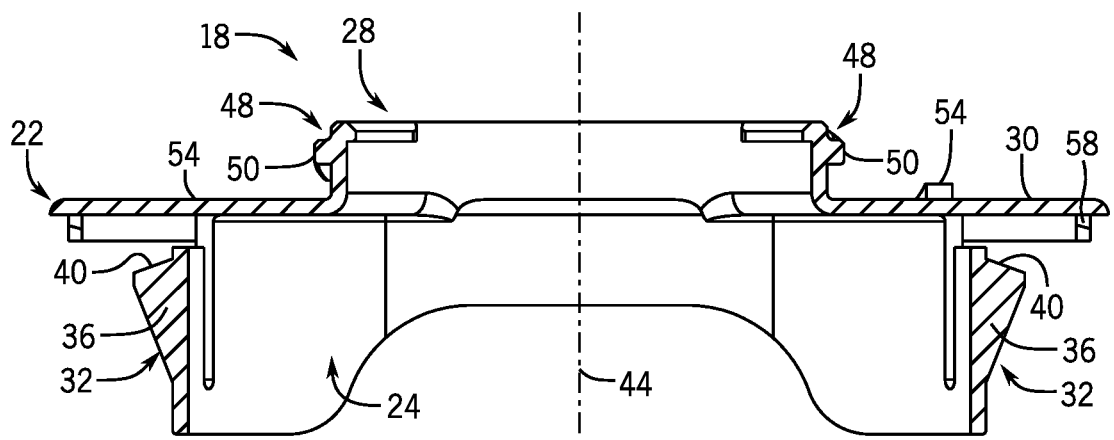
FIG. 7 is a cross-sectional view of the grommet and seal of FIG. 6 taken along line 7-7.
Figure 8:
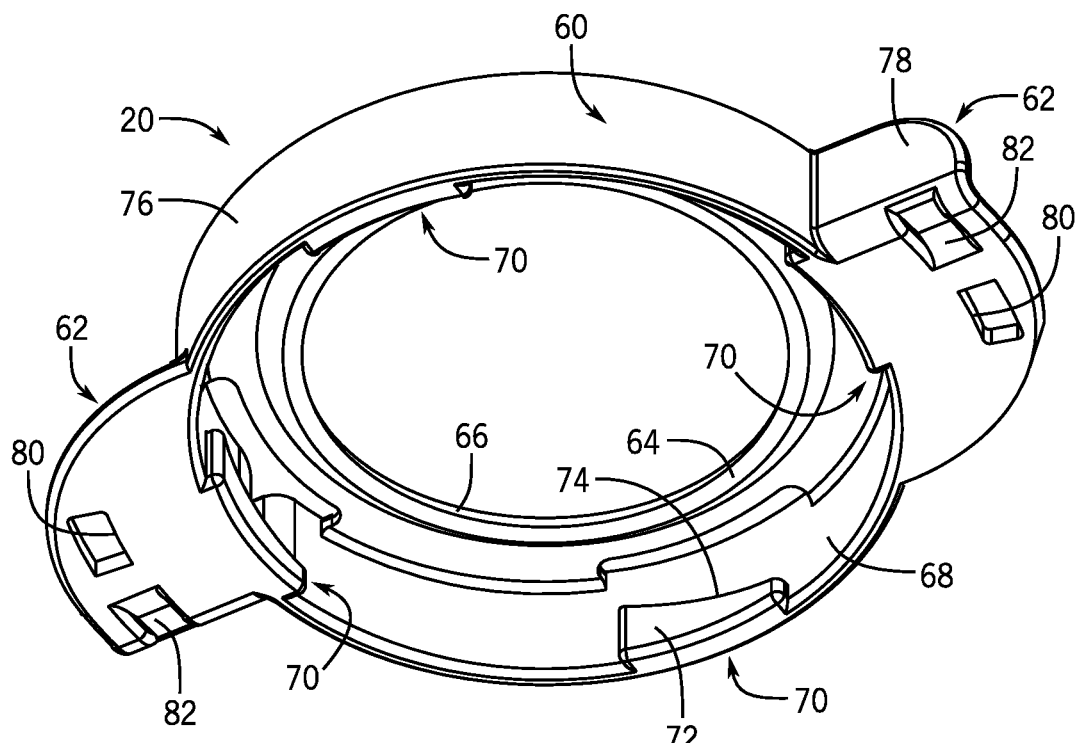
FIG. 8 is a bottom, front, left isometric view of a lock ring of the sealed pass-through grommet system of FIG. 1.
Figure 9:
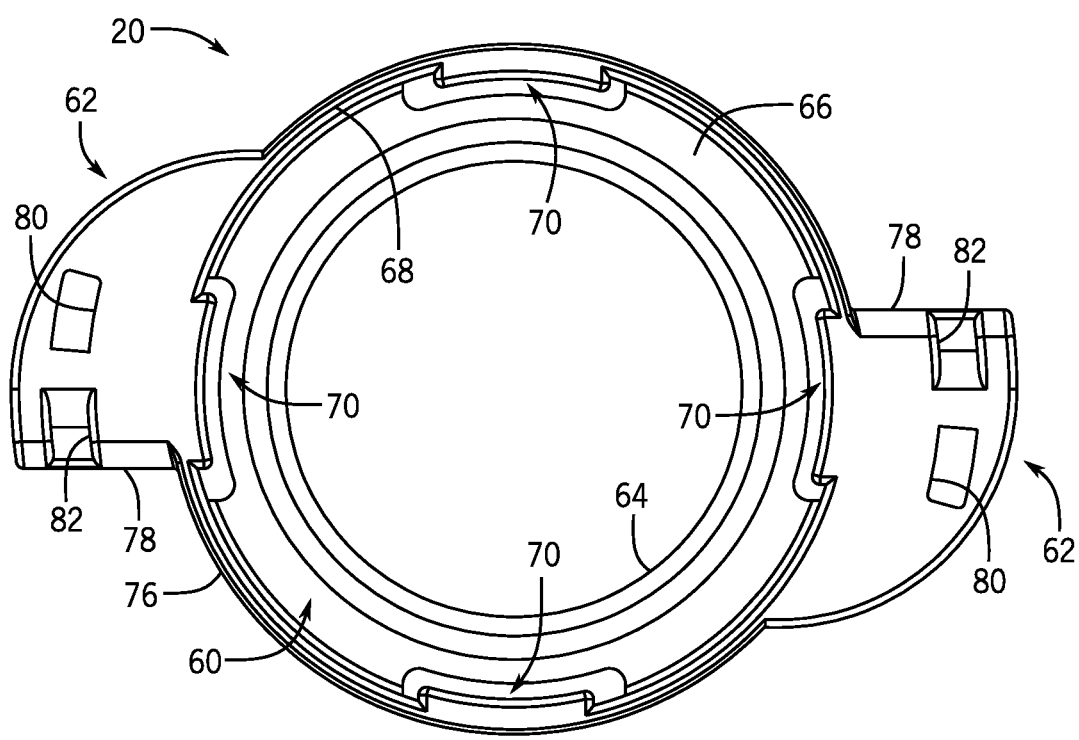
FIG. 9 is a bottom plan view of the lock ring of FIG. 8.

Turning to FIGS. 6 and 7, the grommet 18 includes a primary seal 58 that defines a generally oval shape. Although FIGS. 2-5 do not illustrates the primary seal 58 on the grommet 18, the primary seal 58 may be overmolded onto the grommet 18. Specifically, as illustrated in FIGS. 6 and 7, once the primary seal 58 is overmolded to the grommet 18, the primary seal 58 extends around a periphery of the first surface 26. In some embodiments, the primary seal 58 may be an adhesive strip.

In general, the lock ring 20 may be selectively fastened to the grommet 18, for example, to form a secondary seal in addition to the primary seal 58. In some embodiments, the secondary seal may be formed via compression of a portion of the conduit 14 that occurs when the lock ring 20 is fastened to the grommet 18. With reference to FIGS. 8-11, the lock ring 20 includes a central hub 60 and one or more locking flanges 62. The central hub 60 defines a generally annular shape and includes a central aperture 64 formed in a top wall 66 and an inner surface 68 that extends axially from the outer periphery of the top wall 66. When the lock ring 20 is fastened to the grommet 18, the central aperture 64 may be arranged generally concentrically with the passageway 42 formed in the grommet 18.

In the illustrated embodiment, the inner surface 68 of the central hub 60 includes a plurality of ring clamping features 70 arranged around the inner surface 68. In the illustrated embodiment, the central hub 60 includes four ring clamping features 70 arranged circumferentially around the inner surface 68 in equally-spaced increments. In some embodiments, the central hub 60 may include more or less than four ring clamping features 70 spaced circumferentially around the inner surface 68 in any increment. In the illustrated embodiment, each of the ring clamping features 70 defines a generally wedged protrusion 72 that extends radially inwardly from the inner surface 68. Each of the wedged protrusions 72 includes a helical surface 74 that is angled helically (i.e., each of the helical surfaces 74 defines a helical path as it extends circumferentially along the inner surface 68). For example, when the grommet assembly 12 is assembled, the helical surfaces 74 may be angled helically relative to the center axis 44.

In the illustrated embodiment, the lock ring 20 includes a pair of locking flanges 62 arranged on laterally-opposing sides of the central hub 60. Each of the locking flanges 62 extends radially outwardly from an outer surface 76 of the central hub 60 and includes an axially-extending tightening surface 78, a locking slot 80, and a lead-in recess 82. The tightening surfaces 78 may be gripped by a user or engaged by a tool to rotationally tighten the lock ring 20. The locking slots 80 and the lead-in recesses 82 extend along a generally circumferential path (i.e., as the lock ring 20 is rotated the locking slot 80 and the lead-in recess 82 are arranged to sequentially engage the ramped tabs 54). In the illustrated embodiment, the locking slots 80 extend axially through the locking flanges 62 and circumferentially along a portion of the locking flanges. Each of the locking slots 80 is configured to receive a corresponding one of the ramped tabs 54 therein. The lead-in recesses 82 may be arranged rotationally upstream of the locking slots 80. That is, during rotation of the lock ring 20 relative to the grommet 18, the ramped tabs 54 may first engage the lead-in recesses 82 and then snap into the locking slots 80. In the illustrated embodiment, the lead-in recesses 82 define a recess that extends axially into the locking flanges 62 and circumferentially from a location that is generally aligned circumferentially with the tightening surfaces 78 to a location between the tightening surfaces 78 and the locking slots 80.

Figure 10:
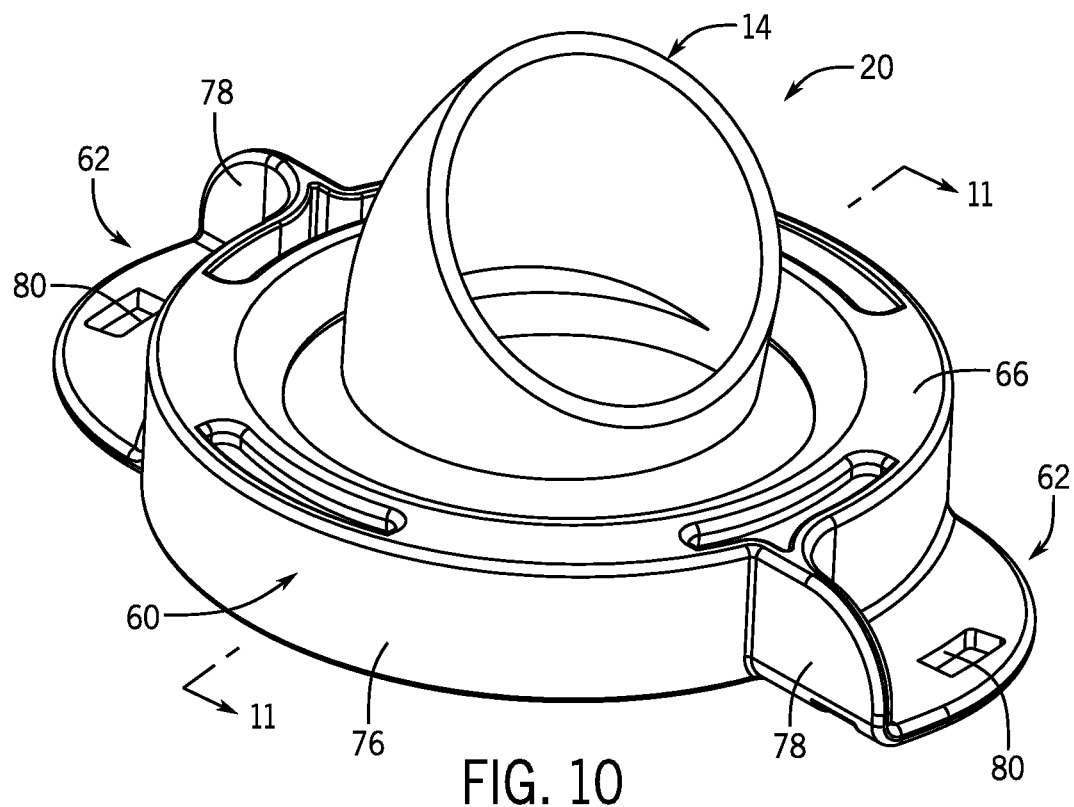
FIG. 10 is a top, front, left isometric view of the lock ring of FIG. 8 assembled to a routing element.
Figure 11:
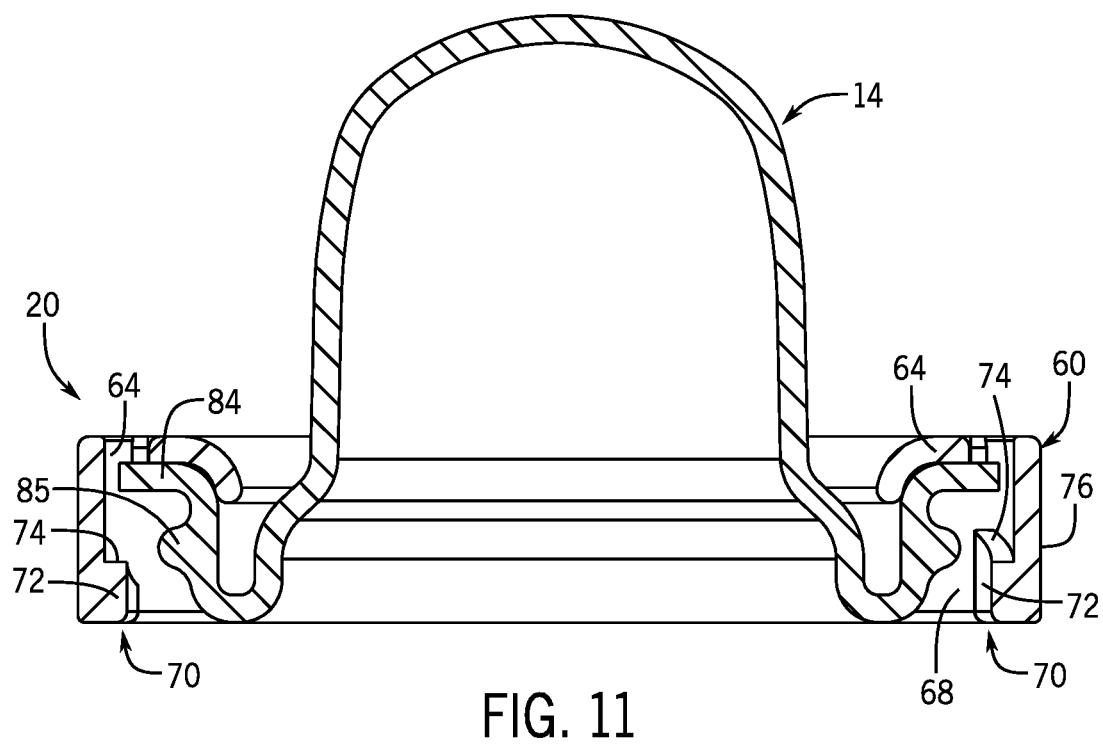
FIG. 11 is a cross-sectional view of the lock ring and routing element of FIG. 10 taken along line 11-11.

With specific reference to FIGS. 10 and 11, in some embodiments, the lock ring 20 may be assembled to the conduit 14 prior to fastening to the grommet 18. For example, in the illustrated embodiment, the conduit 14 includes a conduit flange 84 and a conduit bead 85 arranged at each end of the conduit 14. To assemble the conduit 14 to the lock ring 20, the conduit 14 may be passed through the central aperture 64 of the lock ring 20 and pulled through until the conduit flange 84 engages the top wall 66 of the central hub 60. The engagement between the conduit flange 84 and the top wall 66 may act as a stop for the conduit 14 and prevent the conduit 14 from being pulled further through the central aperture 64. While the engagement between the conduit flange 84 and the top wall 66 may prevent the conduit from being further pulled through the lock ring 20, the lock ring 20 may be rotatable relative to the conduit flange 84.

With the lock ring 20 assembled to the conduit 14, the one or more components being routed through the conduit 14 may be inserted through the lock ring 20 and the conduit 14. For example, one or more wires, one or more connectors, a wiring harness, and/or any additional components needing to be routed through the conduit 14 may be inserted through the assembled lock ring 20 and the conduit 14 forming a conduit subassembly.

Operation and assembly of the grommet assembly 12 will be described with reference to FIGS. 1 and 12-18. Looking first to FIGS. 12 and 13, the grommet 18 with the primary seal 58 overmolded thereto may be installed into the opening 34 formed in the panel 16. Specifically, the panel portion 24 of the grommet 18 may be inserted axially through the opening 34. As the panel portion 24 is inserted through the opening 34, the edge of the opening 34 may engage retention arms 36 and force the retention arms 36 to flex laterally inward until the edge of the opening 34 engages the ramped surface 40 on the retention arms 36. Once the edge of the opening 34 engages the ramped surface 40, the retention arms 36 may flex laterally outward to snap the grommet 18 into the opening 34. The engagement between the ramped surfaces 40 and the edge of the opening 34 prevents the grommet 18 from displacing axially relative to the opening 34 (i.e., prevents removal of the grommet 18 from the opening 34).

With the grommet 18 secured axially by the retention arms 36, the axial insertion of the grommet 18 into the opening 34 brings the primary seal 58 into engagement with the panel 16. In some embodiments, the panel 16 and the grommet 18 may be subjected to a heat cycle to activate the adhesive in the primary seal 58. For example, in some non-limiting applications, the grommet assembly 12 may be installed on a panel in an automotive application. In this non-limiting application, a paint oven may provide heat to activate the adhesive in the primary seal 58. In some embodiments, once the primary seal 58 is activated, the primary seal 58 may be permanently attached to the panel 16 and form a seal at the interface between the panel 16 and the periphery of the grommet 18. In some embodiments, as will be described herein, the primary seal 58 may not require heat activation for form a seal between the panel 16 and the grommet 18.

Figure 14:
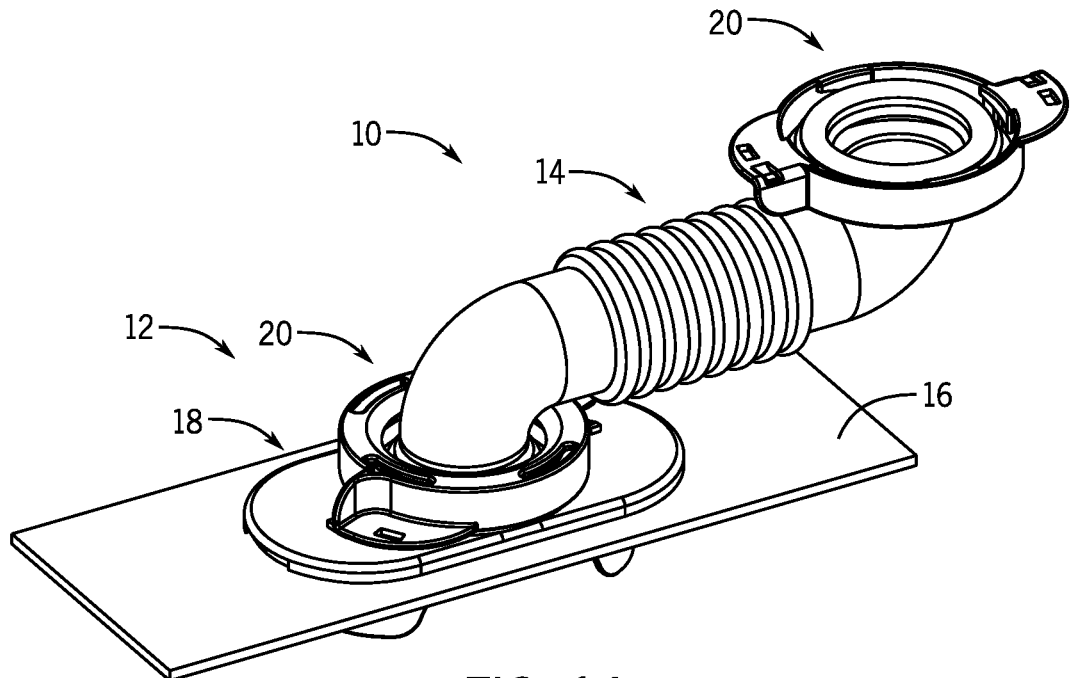
FIG. 14 is a top, front, right isometric view of the sealed pass-through grommet system of FIG. 1 with the lock ring installed onto the grommet and partially rotated.
Figure 15:
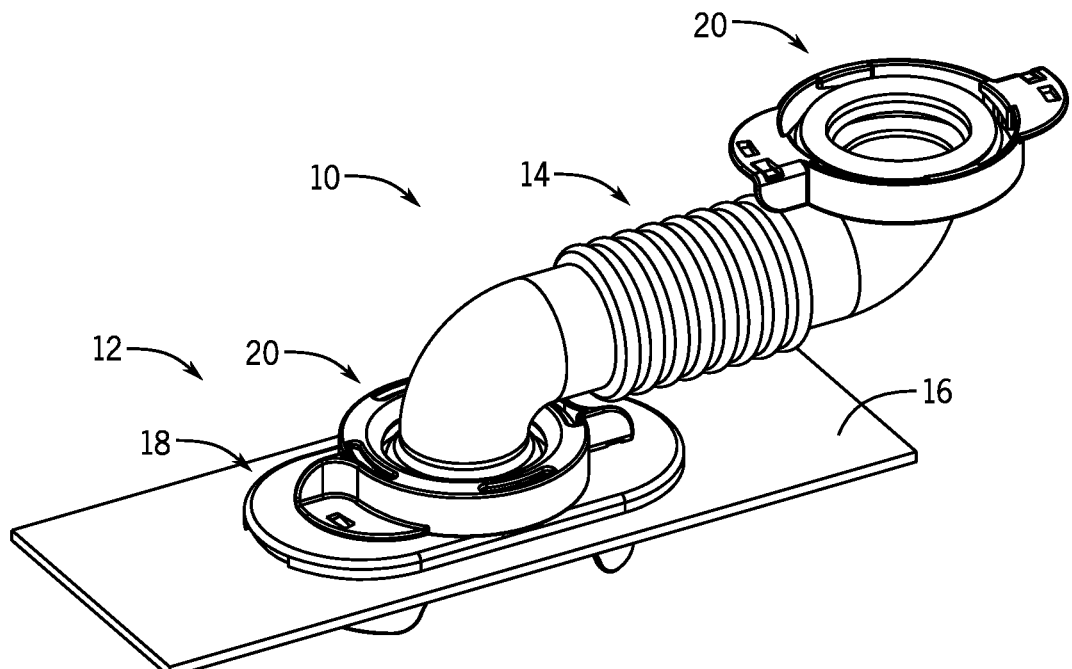
FIG. 15 is a top, front, right isometric view of the sealed pass-through grommet system of FIG. 14 with the lock ring completely rotated after assembly.

With reference to FIGS. 14 and 15, once the grommet 18 is installed into the opening 34 of the panel 16 and sealed to the panel 16 via the primary seal 58, the subassembly including the conduit 14 and the lock rings 20 may be installed to the grommet 18. Only one of the grommet/panel assemblies is illustrated in the figures but the following description would be applied to the other grommet/panel assembly to complete the assembly of the grommet system 10 (see FIG. 1). Initially, the ends of the components routed through the conduit 14 may be inserted through the passageway 42 formed axially through the grommet 18. The lock ring 20 may then be axially inserted over the grommet 18, so that the ring portion 28 is received within the central hub 60 of the lock ring 20. The lock ring 20 may be completely inserted onto the grommet when the grommet clamping features 48 are circumferentially offset from the ring clamping features 70. With the lock ring 20 axially inserted over the grommet 18, the grommet clamping features 48 may be aligned to engage with the ring clamping features 70, upon rotation of the lock ring 20 relative to the grommet 18.

The lock ring 20 may be rotated relative to the grommet 18 (e.g., clockwise in the illustrated non-limiting example of FIGS. 14 and 15). The rotation of the lock ring 20 relative to the grommet 18 brings the grommet clamping features 48 into engagement with the ring clamping features 70. Specifically, the helical surfaces 74 on the wedged protrusions 72 of the lock ring 20 may engage and slide along the helical protrusions 50 of the grommet 18. Due to the helical shape of the helical surfaces 74 and the helical protrusions 50, the relative rotation between the lock ring 20 and the grommet 18 may result in the lock ring 20 displacing axially toward the grommet 18.

The lock ring 20 may be rotated relative to the grommet 18, further drawing the lock ring 20 axially closer to the grommet 18, until the ring retention features 52 snap into the locking slots 80. For example, as the lock ring 20 is rotated relative to the grommet 18, the lead-in recesses 82 the ramped tabs 54 to promote smoother rotation of the lock ring 20 relative to the grommet 18. That is, the lead-in recesses 82 may reduce the torque necessary to overcome the initial engagement between the ramped tabs 54 and the locking flanges 62, and the axial flexing of the locking flanges 62 relative to the platform 22 (e.g., in an upward direction from the perspective of FIG. 14), necessary to traverse over the ramped tabs 52. Continued rotation of the lock ring 20 results in the ramped tabs 54 traversing along the locking flanges 62 until they are aligned with the locking slots 80, at which point the ramped tabs 54 snap into the locking slots 80 and axially protrude therethrough, which allows the locking flanges 62 to axially flex relative to the platform 22 (e.g., downwardly from the perspective of FIG. 15). In this way, for example, the interaction between the ramped tabs 54 and the locking slots 80 may provide a visual, haptic, and/or audio indication that the lock ring 20 is completely fastened to the grommet 18. For example, when the ramped tabs 54 snap into the locking slots 80, a user may hear an audible click and/or feel the displacement of the locking flanges 62 that results from the ramped tabs 54 snapping into the locking slots 80.

Figure 16:
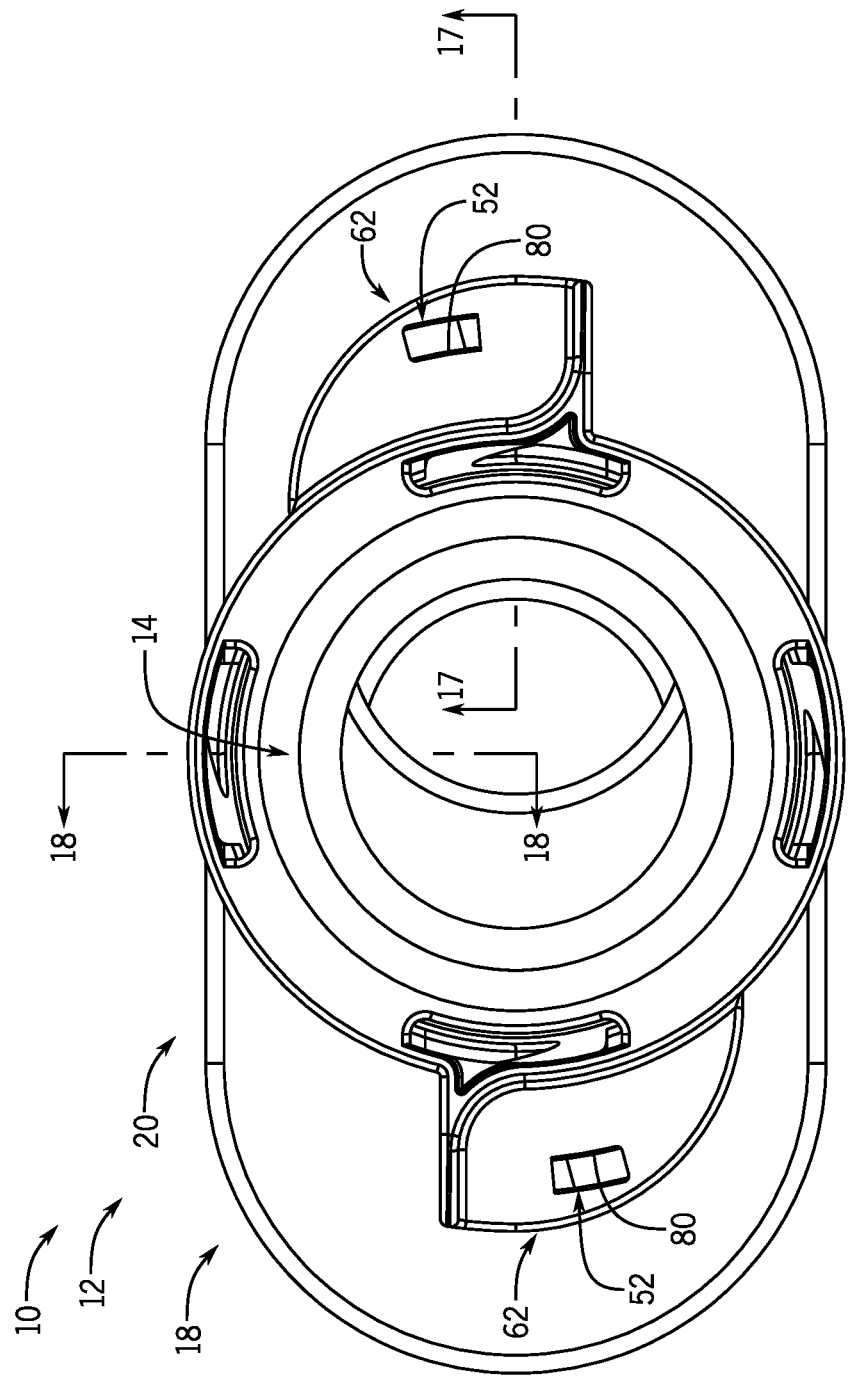
FIG. 16 is a top plan view of the sealed pass-through grommet system of FIG. 15 with a conduit partially hidden.
Figure 17:
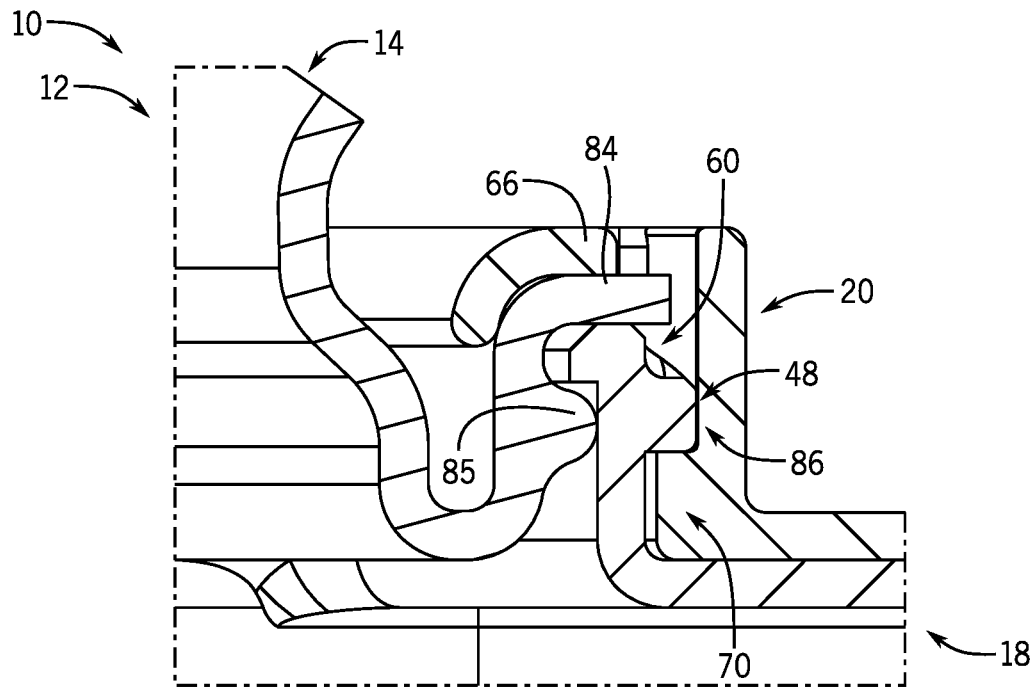
FIG. 17 is a partial cross-sectional view of the sealed pass-through grommet system of FIG. 16 taken along line 17-17.
Figure 18:
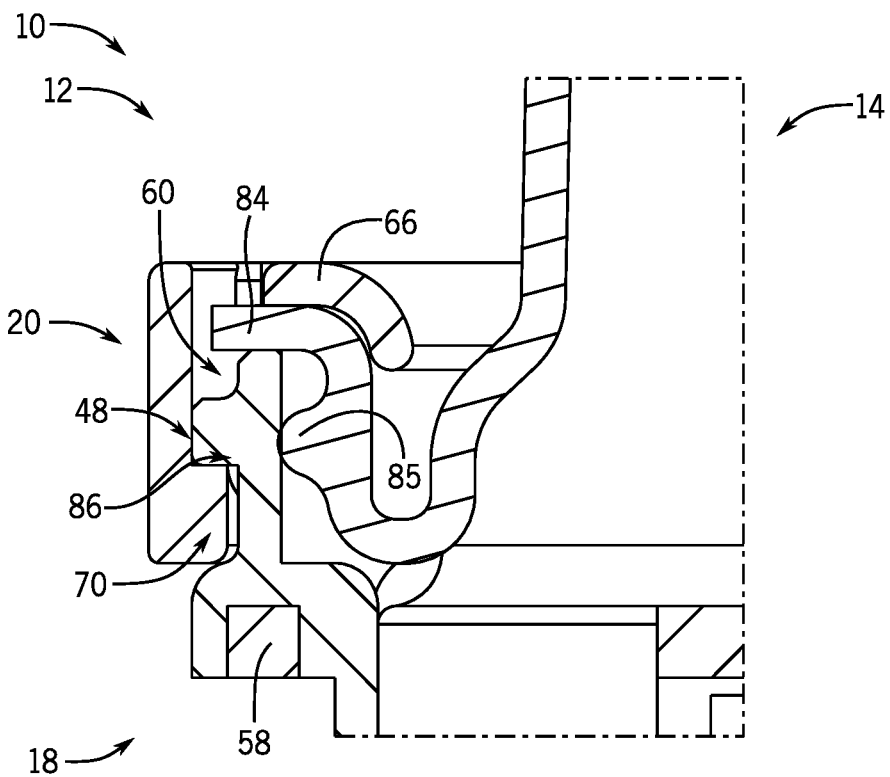
FIG. 18 is a partial cross-sectional view of the sealed pass-through grommet system of FIG. 16 taken along line 18-18.

Turning to FIGS. 16-18, the axial displacement of the lock ring 20 toward the grommet 18 that occurs during rotation of the lock ring 20 compresses the conduit flange 84 between the grommet 18 and the lock ring 20. As such, once the lock ring 20 is completely fastened to the grommet 18, the conduit flange 84 is compressed between the ring portion 28 of the grommet 18 and the top wall 66 of the lock ring 20. In addition, the conduit bead 85 may be compressed against the inner side of the ring portion 28. The compression of the conduit flange 84 and the conduit bead 85 forms a secondary seal 86 along the passageway 42. That is, with the lock ring 20 completely fastened to the grommet 18, the passageway 42 extends through the grommet 18, the lock ring 20, and the conduit 14 and includes the primary seal 58 and the secondary seal 86 to prevent, for example, liquids (e.g., water) from entering the passageway 42 and reaching the components being routed through the grommet assembly 12 and the conduit 14. In the illustrated embodiment, the secondary seal 86 is axially separated from a plane along which the primary seal 58 and is axially separated from a plane along which the opening 34 in the panel 16 is defined. In this way, for example, the secondary seal 86 raises the next possible location for leakage away from the panel 16, thereby reducing the possibility of leakage due to liquid pooling on the panel 16.

In some non-limiting applications, the grommet system 10 may be used to route components in a tailgate on a vehicle. However, the design and properties of the grommet assembly 12 may be utilized for routing components at any location within a vehicle, for example, a floor, a door, a floor pan, a dash, or on a mild hybrid electric vehicle. In some non-limiting applications, the grommet assembly 12 may be used as an access point in a body of a vehicle where a seal is required when not in use. For example, the grommet assembly 12 may be used as an access point for a parking brake assembly, a fuel pump, and/or an electronic module.

It should be appreciated that the design and properties of the grommet assembly 12 may be applied to other applications other than a conduit. For example, the design and properties of the grommet assembly 12 may be implemented to seal a wiring boot, a flanged pipe, a tube, or any other component that requires a sealed passageway through a panel, a wall, or another structure.

Figure 19:
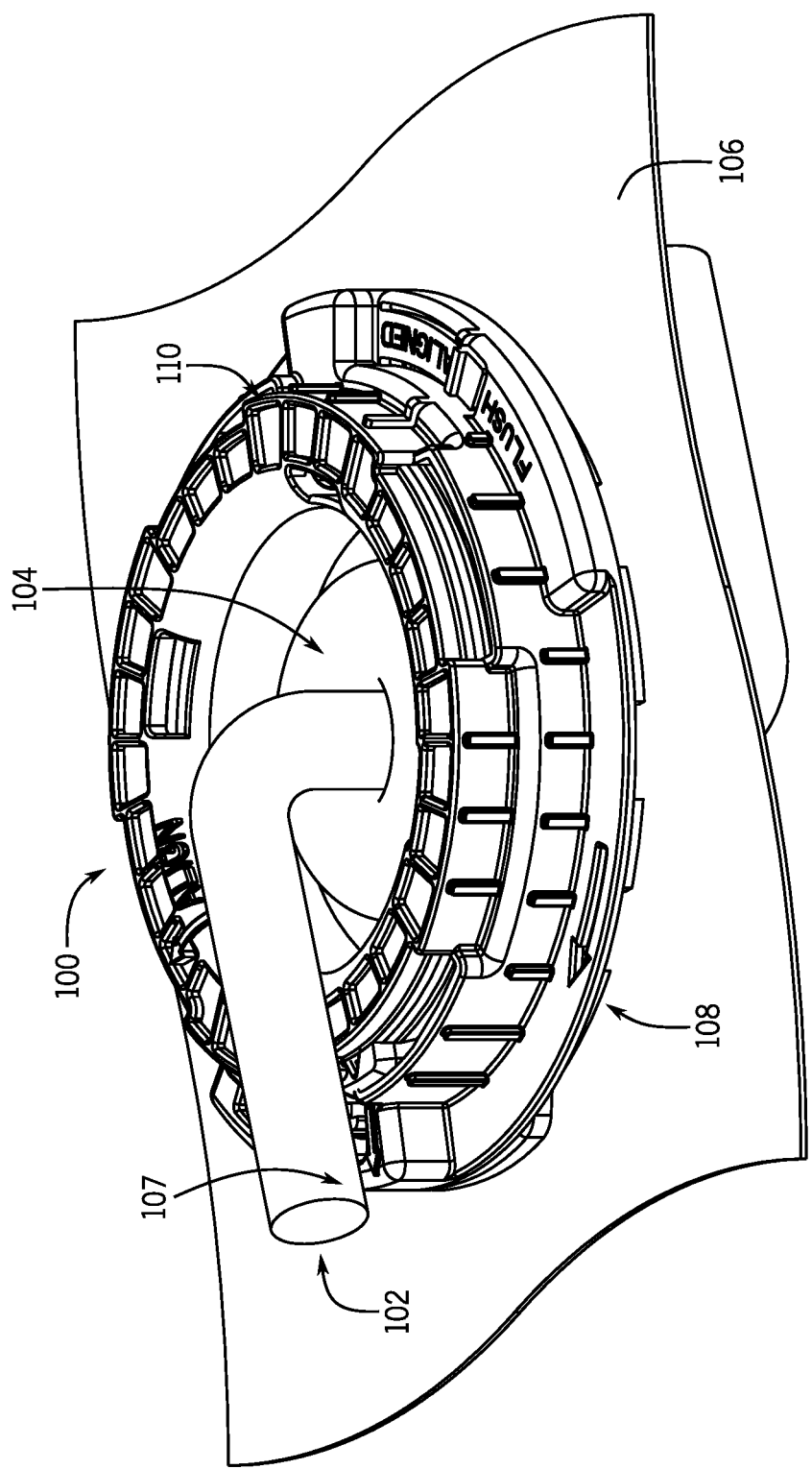
FIG. 19 is a top, front, left isometric view of another sealed pass-through grommet system according to the present disclosure.
Figure 20:
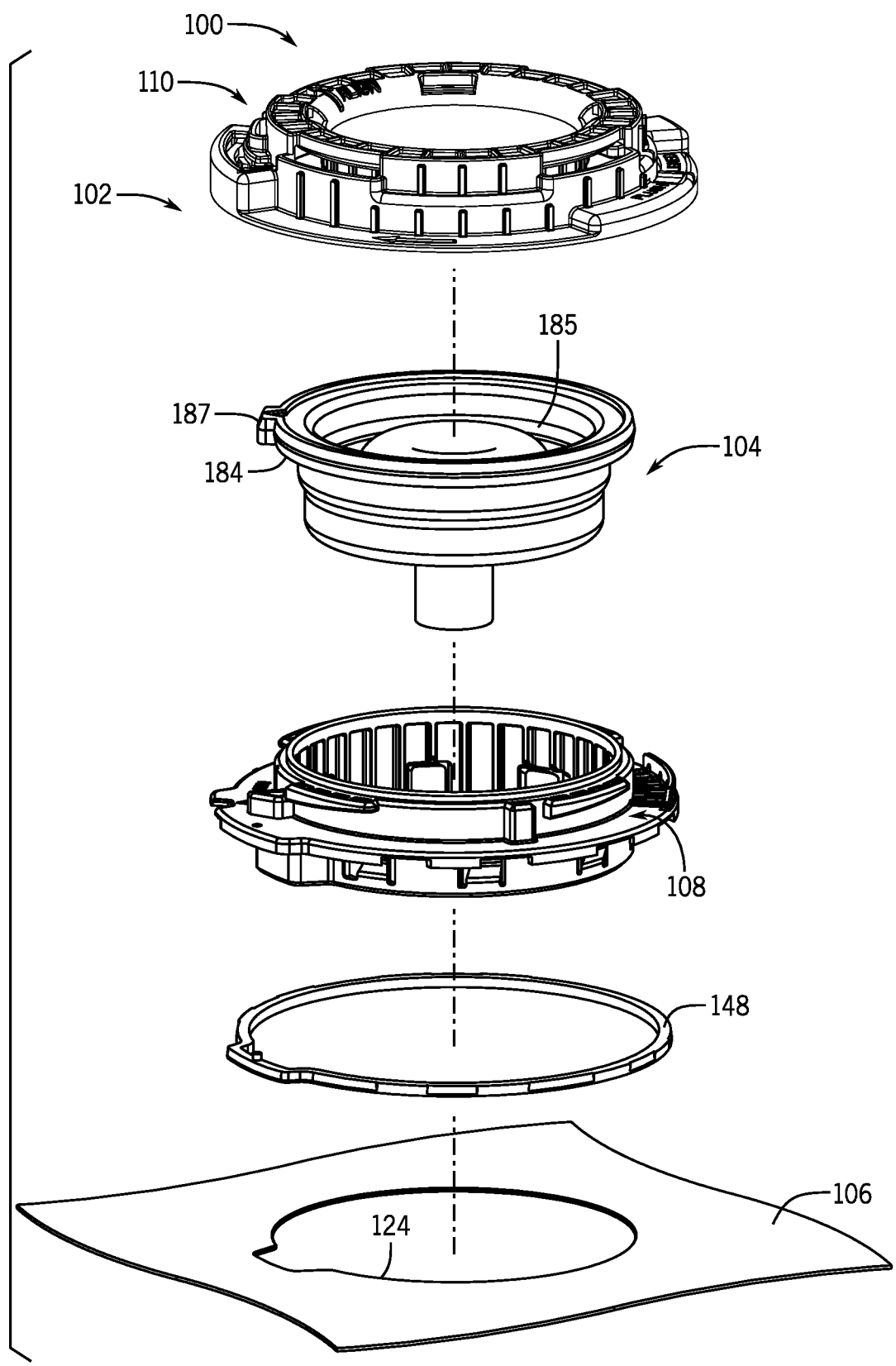
FIG. 20 is an exploded top, front, left isometric view of the sealed pass-through grommet system of FIG. 19.

For example, FIGS. 19 and 20 illustrate a grommet system 100 according to another aspect of the present disclosure. In the illustrated embodiment, the grommet system 100 includes a grommet assembly 102 coupled to a boot 104 (e.g., a cable boot or a wiring boot). The grommet assembly 102 provides a sealed passageway through a panel 106 and the boot 104, which enables, for example, wiring components 107 (e.g., wires, wire bundles, cables, connectors, etc.) to be routed through the panel 106, the boot 104, and the grommet assembly 102.

The grommet assembly 102 includes a grommet 108 and a lock ring 110 configured to be selectively fastened to the grommet 108. As illustrated in FIGS. 21-25, the grommet 108 includes a platform 112, a panel portion 114 extending from a first surface 116 of the platform 112, and a ring portion 118 extending from a second surface 120 of the platform 112. In the illustrated embodiment, the panel portion 114 and the ring portion 118 extend from the platform 112 in opposing directions (e.g., axially away from one another).

Figure 25:
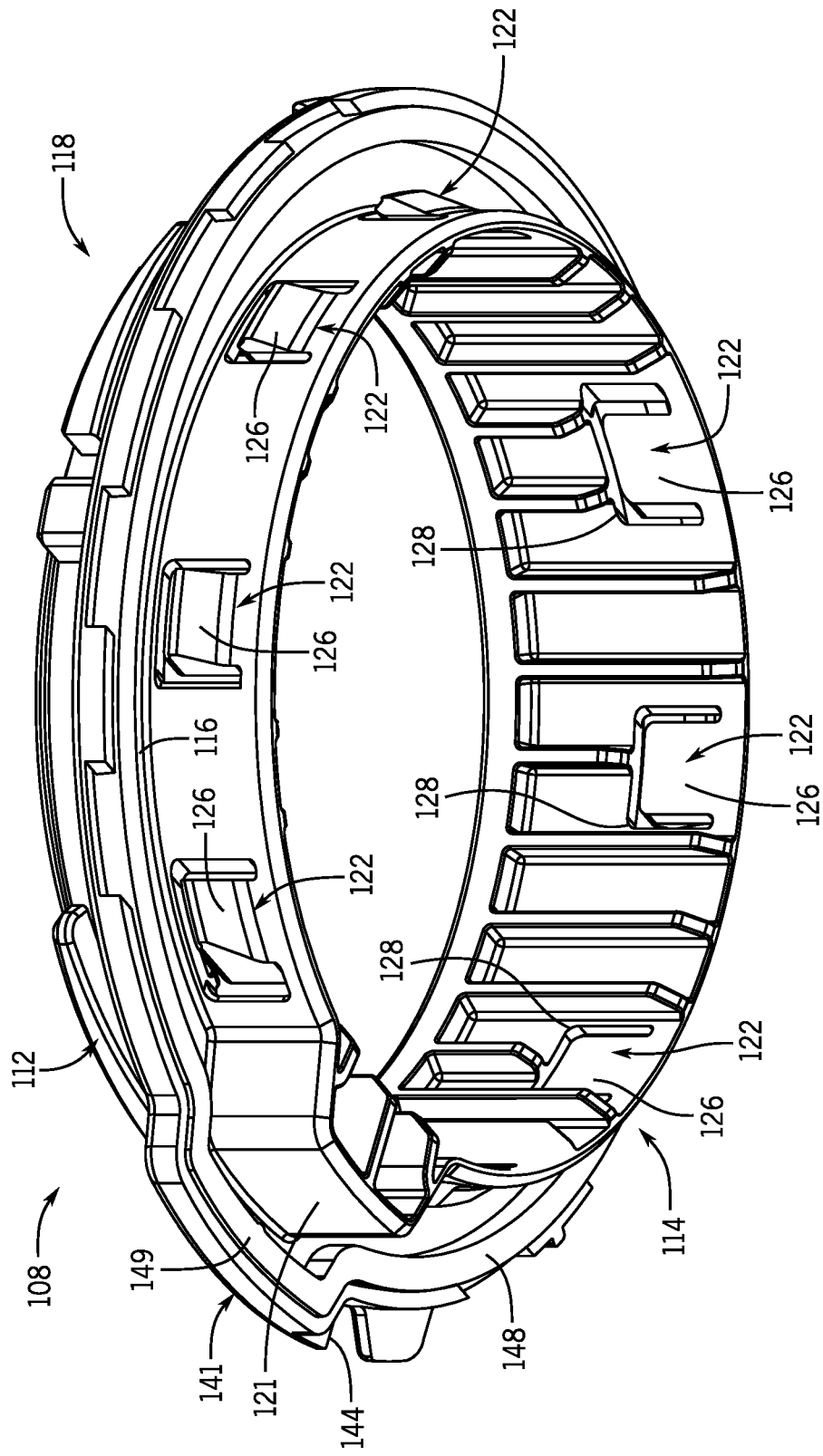
FIG. 25 is a bottom, front, left isometric view of the grommet of FIG. 21 assembled to a seal.
Figure 26:
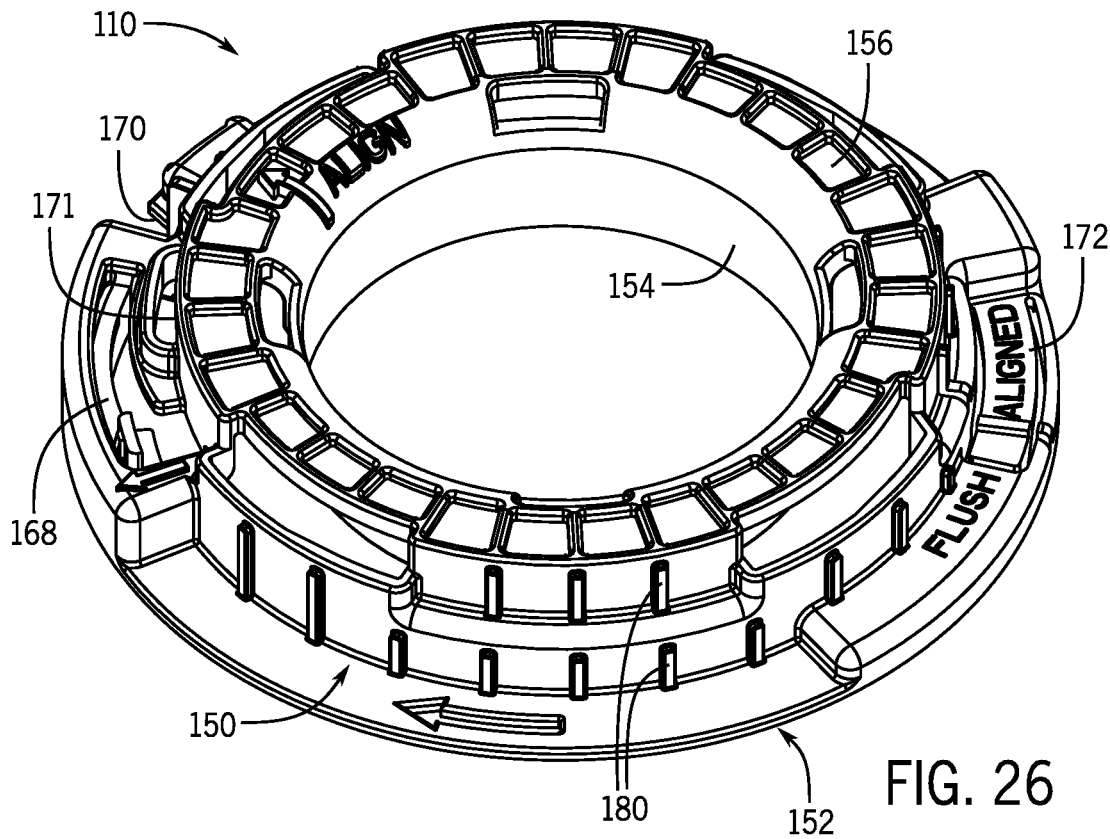
FIG. 26 is a top, front, left isometric view of a lock ring of the sealed pass-through grommet system of FIG. 19.
Figure 27:
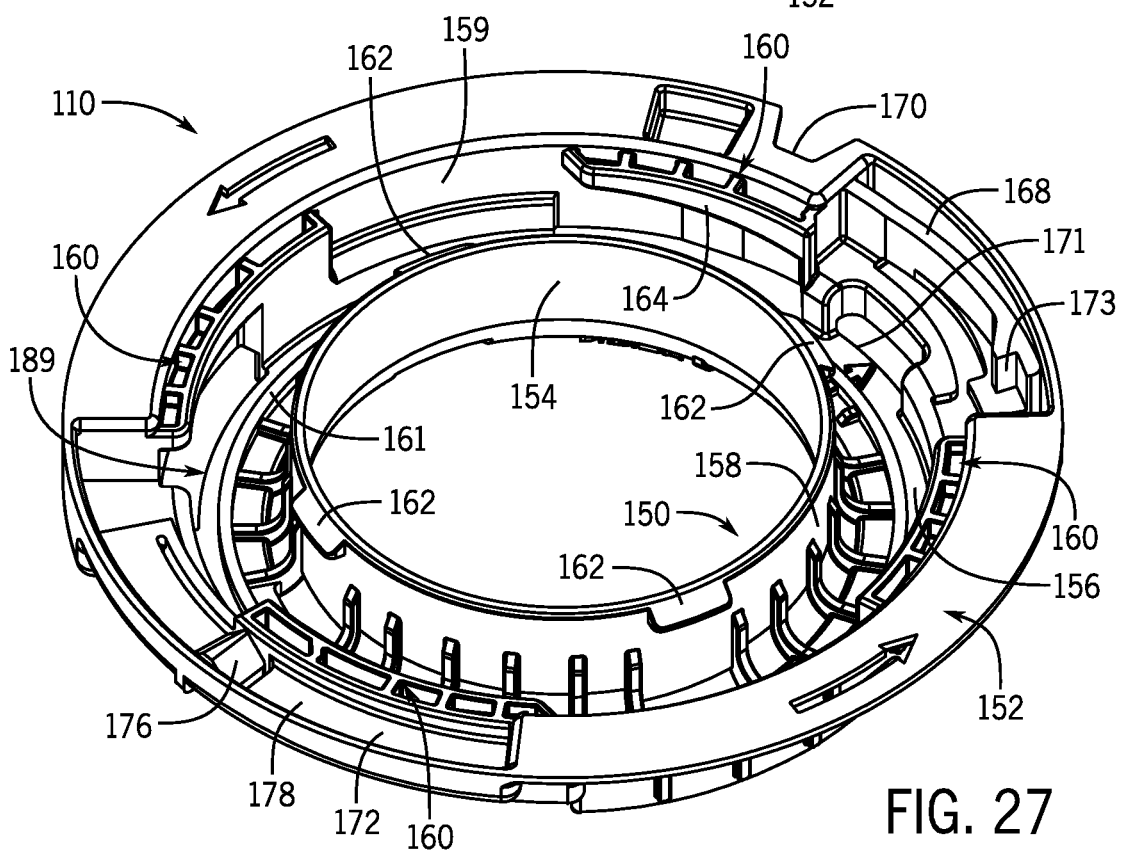
FIG. 27 is a bottom, back, right isometric view of the lock ring of FIG. 26.
Figure 28:
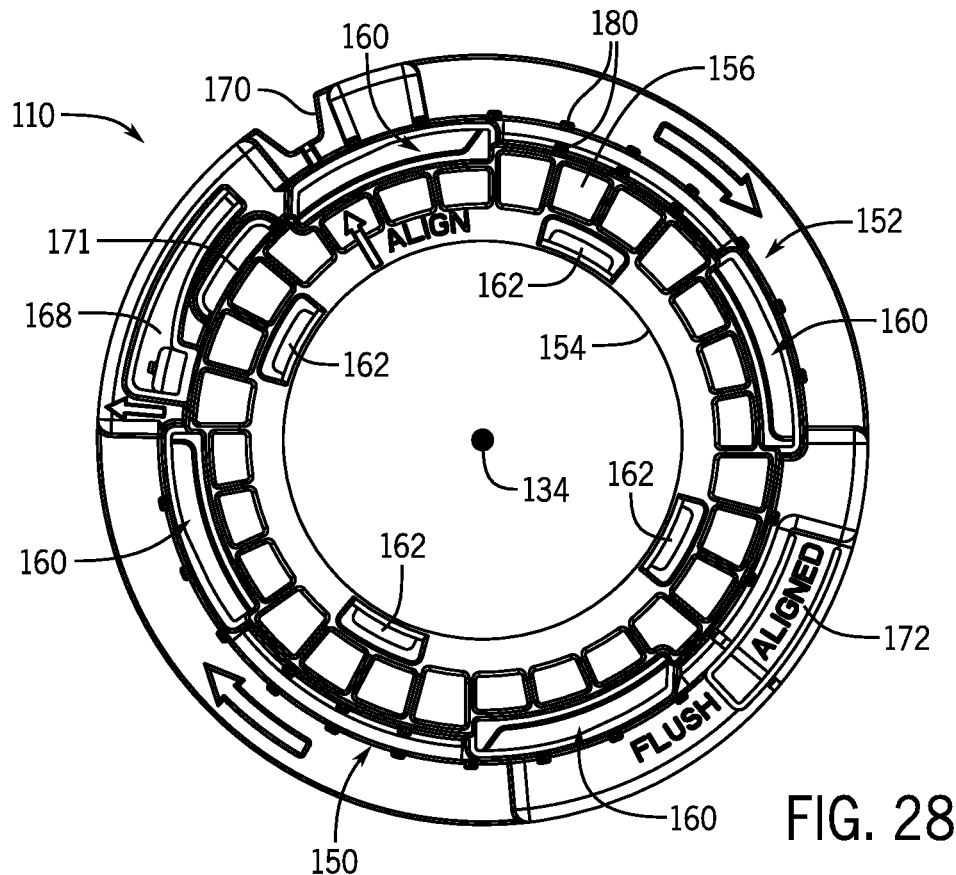
FIG. 28 is a top plan view of the lock ring of FIG. 46.
Figure 29:
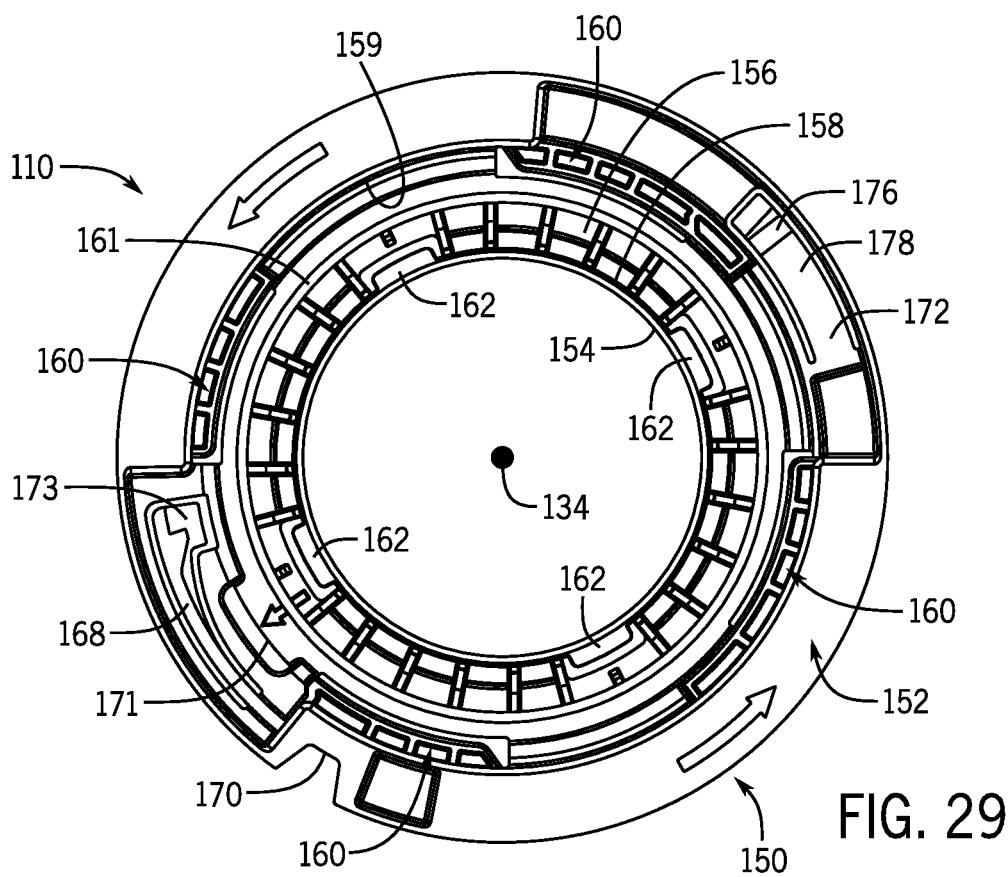
FIG. 29 is a bottom plan view of the lock ring of FIG. 46.

The panel portion 114 extends axially away from the first surface 116 (e.g., a bottom surface from the perspective of FIG. 22) and defines a generally annular or ring shape with a bulb 121 that protrudes radially outward along a portion of the circumference of the panel portion 114 (see FIG. 25). The panel portion 114 is generally hollow and includes a plurality of panel retention features 122 arranged around the panel portion 114. In general, the panel retention features 122 are configured to selectively engage an opening 124 in the panel 106 (see FIG. 20) and retain the grommet 108 within the opening 124.

In the illustrated embodiment, the panel retention features 122 generally include a plurality of retention arms 126. The retention arms 126 are arranged within a cutout 128 that extends partially around a periphery of each of the retention arms 126. For example, one edge of each of the retention arms 126 is formed integrally with, or attached to, the panel portion 114 and the remaining edges are free-floating (e.g., not in contact with) with respect to the panel portion 114 due to the cutout 128. In this way, for example, the retention arms 126 may flex radially with respect to the panel portion 114. In the illustrated embodiment, each of the retention arms 126 includes a ramped surface 130 that, when the panel portion 114 is inserted into the opening 124 of the panel 106, is configured to engage an edge of the opening 124 to retain the grommet 108 within the opening 124 and prevent the grommet 108 from displacing axially relative to the opening 124.

The ring portion 118 extends axially away from the second surface 120 (e.g., a top surface from the perspective of FIG. 22) and defines a generally annular shape. The hollow shape defined by the panel portion 114 and the ring portion 118 defines a passageway 132 that extends axially through the grommet 108 along a center axis 134. The passageway 132 enables components (e.g., wires, wire bundles, cables, connectors, etc.) to be inserted through the grommet 108. The ring portion 118 includes a grommet sealing bead 135 arranged at an axial end thereof (e.g., a top edge from the perspective of FIG. 21) and an outer surface 136 having a plurality of grommet clamping features 138 arranged around the outer surface 136. For example, in the illustrated embodiment, the ring portion 118 includes four grommet clamping features 138 arranged circumferentially around the outer surface 136 in equally-spaced increments. In some embodiments, the ring portion 118 may include more or less than four grommet clamping features 138 spaced circumferentially around the outer surface 136 in any increment.

In the illustrated embodiment, each of the grommet clamping features 138 defines a generally radial protrusion that extends radially outwardly from the outer surface 136 and is angled helically relative to the center axis 134. That is, each of the grommet clamping features 138 defines a helical surface 140 that extends along a helical path as it extends circumferentially along the outer surface 136 (see FIGS. 22 and 23).

Figure 21:
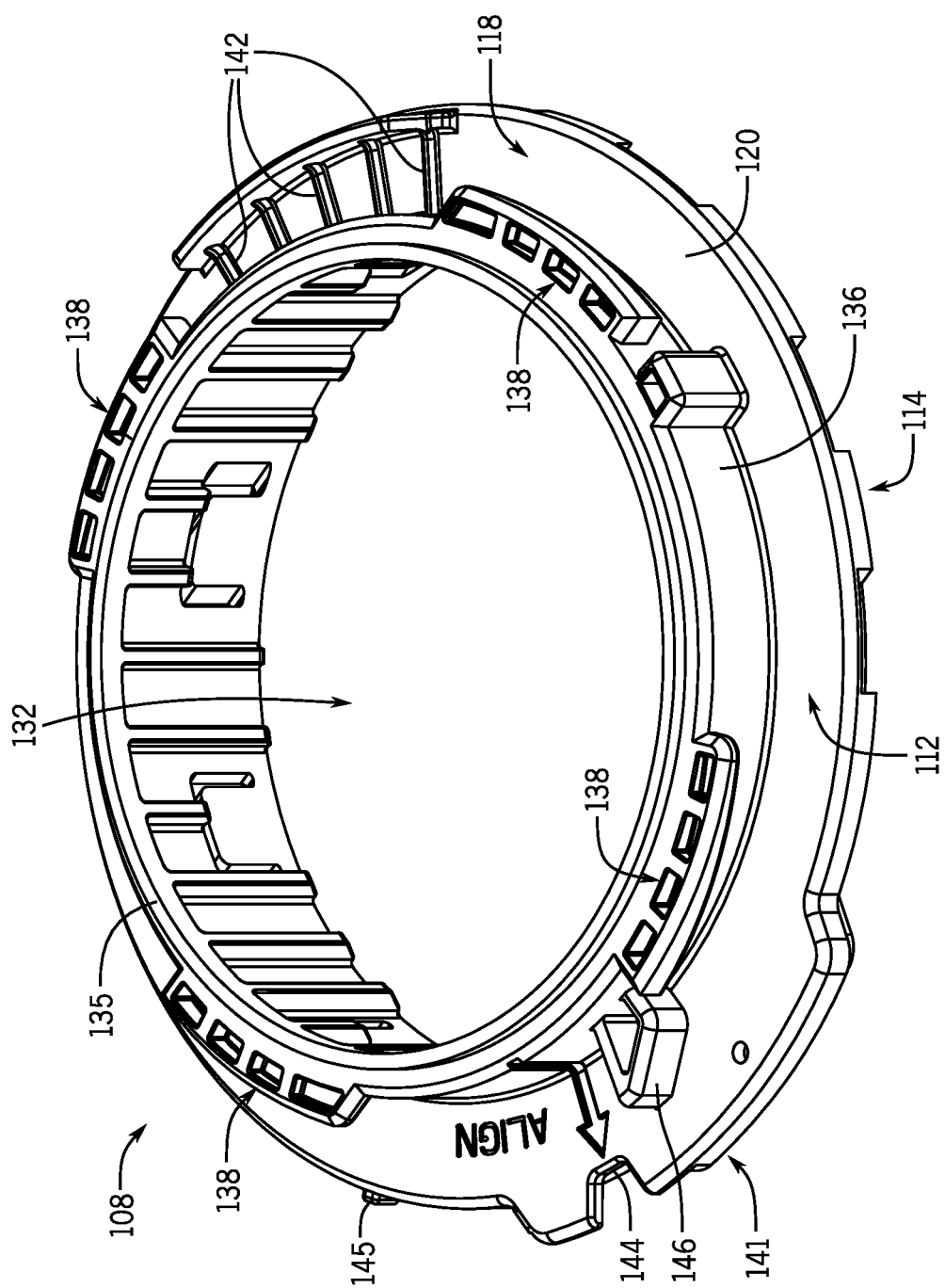
FIG. 21 is a bottom, back, right isometric view of a grommet of the sealed pass-through grommet system of FIG. 19.
Figure 24:
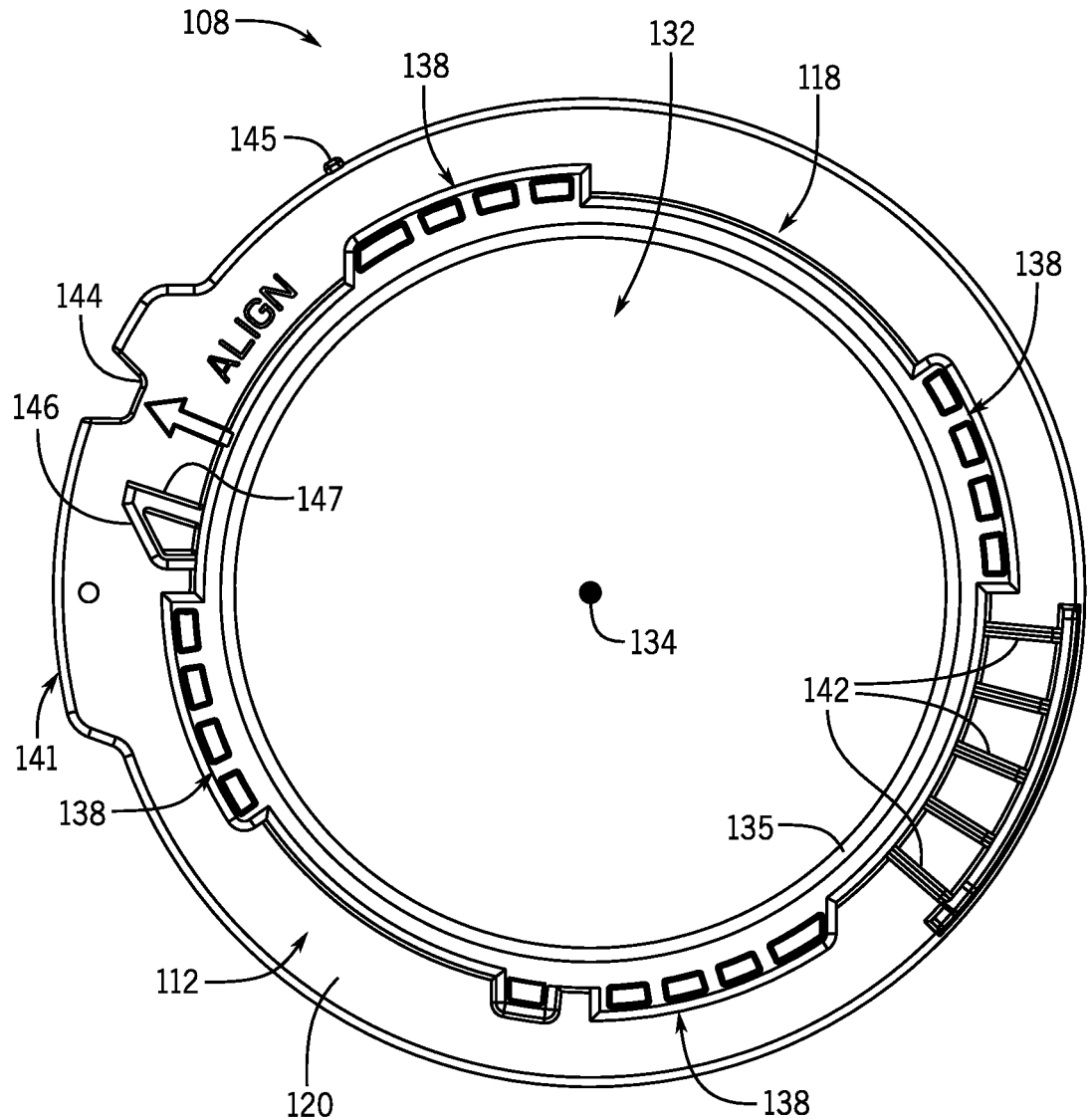
FIG. 24 is a top plan view of the grommet of FIG. 21.

With specific reference to FIGS. 21 and 24, the platform 112 defines a flanged portion 141 that extends radially outward and circumferentially along a portion of the platform 112. The platform 112 includes a plurality of lock verification ribs 142, an initial alignment notch 144, a final alignment pin 145, and a locking wedge 146. Each of the lock verification ribs 142 protrudes axially from the second surface 120 of the platform 112 and extends radially along the second surface 120 of the platform 112. Each of the lock verification ribs 142 is spaced circumferentially from an adjacent lock verification rib 142. In this way, for example, the lock verification ribs 142 define a sequence of circumferentially-spaced ribbed protrusions that span circumferentially along a portion of the second surface 120 of the platform 112. In the illustrated embodiment, the portion of the second surface 120 along which the lock verification ribs 142 span is arranged circumferentially opposite to the flanged portion 141.

The initial alignment notch 144 and the final alignment pin 145 are circumferentially separated and arranged on a periphery of the platform 112. Specifically, the initial alignment notch 144 defines a radially recessed notch formed in the outer periphery of the flanged portion 141, and the final alignment pin 145 protrudes radially outward from a periphery of the platform 112 at a location that is circumferentially spaced from the initial alignment notch 144. The circumferential direction between the initial alignment notch 144 and the final alignment pin 145 may define a direction in which the lock ring 110 is required to be rotated to fasten to the grommet 108 (e.g., clockwise in the illustrated embodiment of FIG. 24). The circumferential distance between initial alignment notch 144 and the final alignment pin 145 may define a rotational distance that the lock ring 110 must be rotated in the required direction to fasten to the grommet 108.

In the illustrated embodiment, the locking wedge 146 extends radially outwardly onto the flanged portion 141 from the outer surface 136 of the ring portion 118. The locking wedge 146 includes a planar surface 147 that extends radially and may define a stop to prevent unwanted unfastening between the grommet 108 and the lock ring 110 (e.g., rotation in a counterclockwise direction).

In the illustrated embodiment, the grommet 108 includes visible indicators (e.g., words, shapes, cutouts, arrows, lines, etc.) that may aid a user in assembling the grommet assembly 102. For example, the indicators may aid a user is aligning the lock ring 110 relative to the grommet 108 prior to fastening (e.g., rotating) the lock ring 110 to the grommet 108, and/or aid a user in determining when the lock ring 110 is completely fastened to the grommet 108.

With reference to FIG. 25, the grommet 108 includes a primary seal 148 that defines a generally annular or ring shape with a seal bulb 149 that protrudes radially outward along a portion of the circumference of the primary seal 148. Although FIGS. 21-24 illustrate the grommet 108 without the primary seal 148, the primary seal 148 may be overmolded onto the grommet 108. Once the primary seal 148 is overmolded to the grommet 108, the primary seal 148 extends around a periphery of the first surface 116. In some embodiments, the primary seal 148 may be an adhesive strip.

In general, the lock ring 110 may be selectively fastened to the grommet 108, for example, to form a secondary seal in addition to the primary seal 148. In some embodiments, the secondary seal may be formed via compression of a portion of the boot 104 that occurs when the lock ring 110 is fastened to the grommet 108. With reference to FIGS. 26-29, the lock ring 110 includes a central hub 150 and a locking flange 152 that extends radially outwardly from the central hub 150. The central hub 150 defines a generally annular shape and includes a central aperture 154, a top wall 156, an inner surface 158 that extends axially from an inner periphery of the top wall 156, and an outer surface 159 that extends axially from an outer periphery of the top wall 156. In the illustrated embodiment, the top wall 156 may include a ring sealing bead 161 that protrudes axially therefrom and extends circumferentially around an inner side (e.g., a side arranged internally to the central hub 150) of the top wall 156. When the lock ring 110 is fastened to the grommet 108, the central aperture 154 may be arranged generally concentrically, or axially aligned, with the passageway 132 formed in the grommet 108. That is, the center axis 134 may extend centrally through the grommet 108 and the lock ring 110 once assembled.

In the illustrated embodiment, the outer surface 159 of the central hub 150 includes a plurality of ring clamping features 160 arranged circumferentially around the outer surface 159. In the illustrated embodiment, the central hub 150 includes four ring clamping features 160 arranged circumferentially around the outer surface 159 in equally-spaced increments. In some embodiments, the central hub 150 may include more or less than four ring clamping features 160 spaced circumferentially around the inner surface 158 in any increment. In the illustrated embodiment, each of the ring clamping features 160 defines a protrusion that extends radially inwardly from the inner surface 158 and is angled helically relative to the center axis 134. That is, each of the ring clamping features 160 defines a helical surface 164 that extends along a helical path as it extends circumferentially along the outer surface 159.

In the illustrated embodiment, the inner surface 158 includes a plurality of boot retention tabs 162 that extend radially outwardly from an axial end of the inner surface 158. In the illustrated embodiment, the inner surface 158 includes four boot retention tabs 162 arranged circumferentially around the end of the inner surface 158 in equally-spaced increments. In other embodiments, the inner surface 158 may include more or less than four boot retention tabs 162 arranged in any increment.

In the illustrated embodiment, the locking flange 152 includes a locking arm 168, a ring alignment notch 170, a boot alignment aperture 171, and a verification or locking tab 172. The locking arm 168 is attached to the locking flange 152 at one end thereof and a distal end of the locking arm 168 is free-floating. In this way, for example, the distal end of the locking arm 168 may be flexible in a general radial direction. The distal end of the locking arm 168 includes a radially-extending locking surface 173 that extends toward the central hub 150 (see FIG. 29). The ring alignment notch 170 extends radially into an outer periphery of the locking flange 152. In other embodiments, the ring alignment notch 170 may be in the form of a pin, arrow, marking, or identifier (e.g., a dot, an engraved shape, or any other visible marking formed on locking flange 152).

The boot alignment aperture 171 defines a circumferentially-extending aperture that is formed adjacent to the locking arm 168. In the illustrated embodiment, the verification tab 172 is arranged circumferentially opposite to the locking arm 168. The verification tab 172 is attached to the locking flange 152 at one end thereof and a distal end of the verification tab 172 is free-floating. In this way, for example, the distal end of the verification tab 172 may be flexible in a general axial direction. The distal end of the verification tab 172 may include a ramped surface 176 that ramps at an angle axially away from (e.g., upward from the perspective of FIG. 27) a bottom surface 178 of the verification tab 172.

In the illustrated embodiment, the lock ring 110 includes visible indicators (e.g., words, shapes, arrows, lines, etc.) that may aid a user in assembling the grommet assembly 102. For example, the indicators may indicate a direction in which to rotate the lock ring 110 relative to the grommet 108. In addition, the indicators may aid a user is aligning the lock ring 110 relative to the grommet 108 prior to fastening (e.g., rotating) the lock ring 110 to the grommet 108. Further, the indicators may aid a user in determining whether the verification tab 172 is providing an indication that the lock ring 110 is completely fastened to the grommet 108.

In the illustrated embodiment, the central hub 150 includes a plurality of radially-extending ribs 180 arranged circumferentially around an outer periphery of the central hub 150. Each of the ribs 180 extends radially outwardly and may enable a tool to be coupled thereto, or provide structure for a user to grip onto, and assist in rotation of the lock ring 110.

Figure 30:
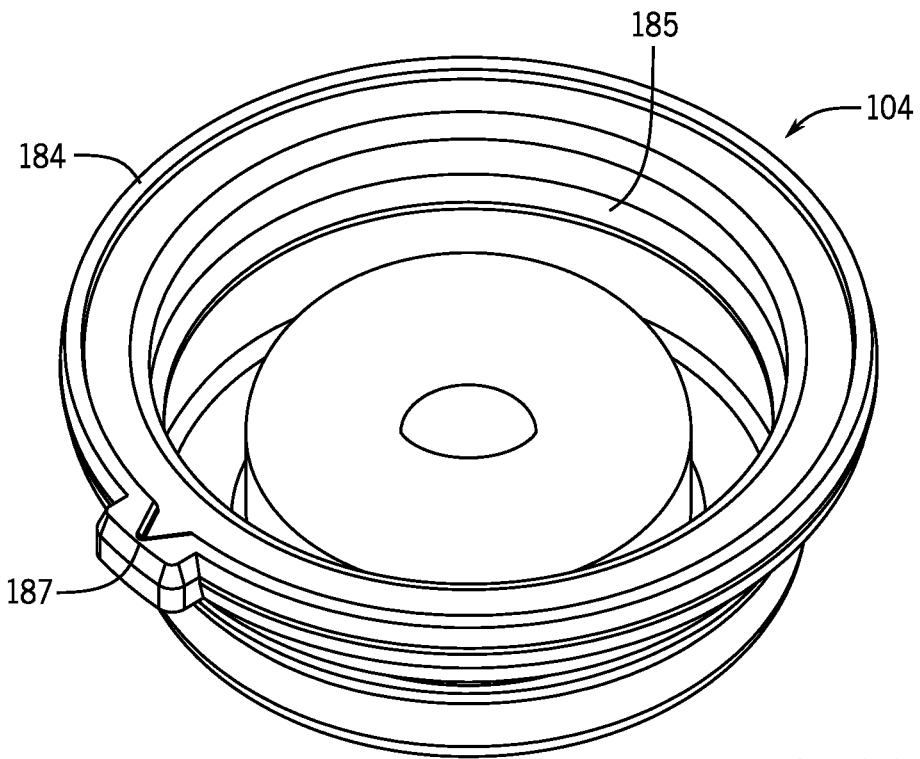
FIG. 30 is a top, front, left isometric view of a routing element the sealed pass-through grommet system of FIG. 19.
Figure 31:
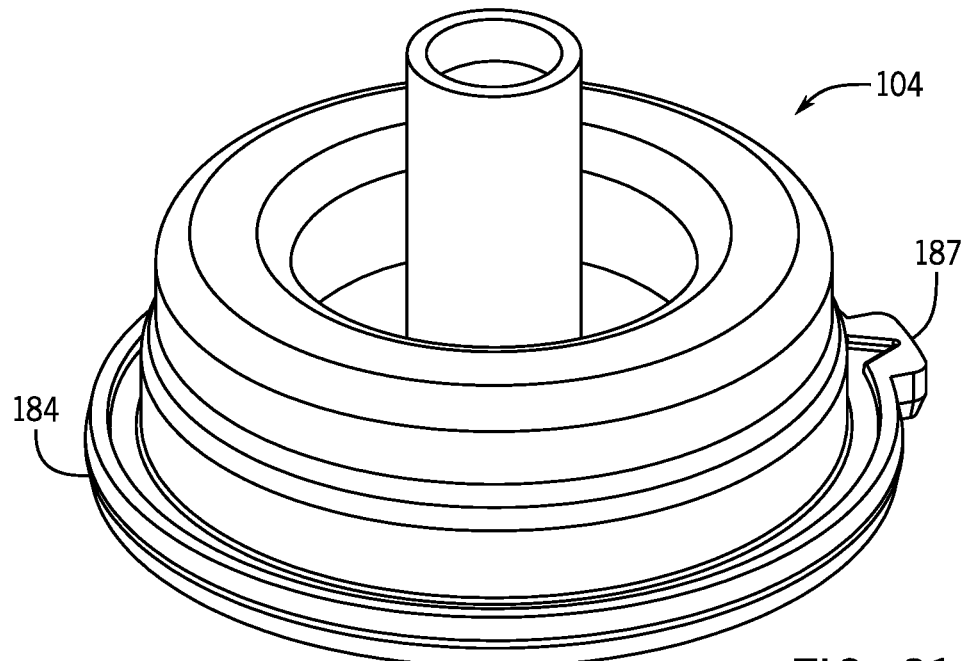
FIG. 31 is a bottom, back, right isometric view of the routing element of FIG. 30.
Figure 34:
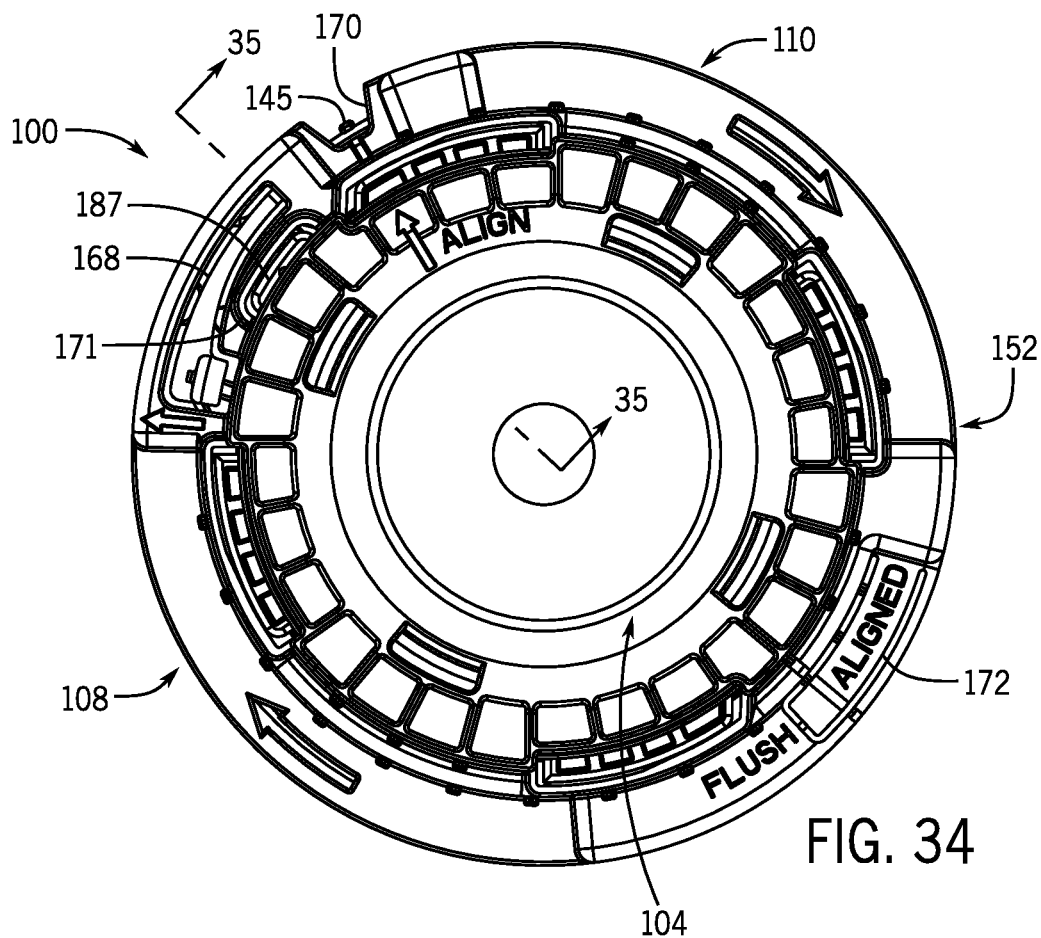
FIG. 34 is a top plan view of the sealed pass-through grommet system of FIG. 32 with the panel hidden.

In some embodiments, the lock ring 110 may be assembled to the boot 104 prior to fastening to the grommet 108. Turning to FIGS. 30-31, in the illustrated embodiment, the boot 104 includes a boot flange 184, a boot retention ring 185, and a boot alignment tab 187. In the illustrated embodiment, the boot flange 184 extends radially outwardly from an axial end of the boot 104. The boot retention ring 185 extends radially inwardly from an inner surface of the boot 104. In the illustrated embodiment, the boot alignment tab 187 extends radially outwardly from a periphery of the boot flange 184. The boot alignment tab 187 is dimensioned to be arranged within the boot alignment aperture 171 of the lock ring 110 (see FIG. 34).

To assemble the boot 104 to the lock ring 110, the boot 104 may be at least partially inserted into the central aperture 154 of the lock ring 110, so that the boot flange 184 is received within a channel 189 formed in the central hub 150 (see FIG. 27) and the boot alignment tab 187 is circumferentially aligned with and at least partially received within the boot alignment aperture 171 of the lock ring 110. The alignment and interaction between the boot alignment tab 187 and the boot alignment aperture 171 may ensure proper rotational orientation of the boot 104 within the lock ring 110, and prevent relative rotation between the boot 104 and the lock ring 110 after the boot 104 is inserted into the lock ring 110. The boot 104 may be inserted into the lock ring 110 until the boot retention ring 185 axially passes and engages the boot retention tabs 162 on the lock ring 110 (see FIG. 35). The engagement between the boot retention ring 185 and the boot retention tabs 162 on the lock ring 110 may act as a stop and axially retain the boot 104 within the lock ring 110 prior to fastening to the grommet 108.

With the lock ring 110 assembled to the boot 104, the one or more components (e.g., the wiring components 107) being routed through the boot 104 may be inserted through the lock ring 110 and the boot 104. For example, one or more wires, one or more connectors, a wiring harness, a cable, a cable bundle, and/or any additional components needing to be routed through the boot 104 may be inserted through the assembled lock ring 110 and the boot 104 forming a boot subassembly.

Further operation and assembly of the grommet assembly 102 will be described with reference to FIGS. 19-35. Looking first to FIGS. 19-25, the grommet 108 with the primary seal 148 overmolded thereto may be installed into the opening 124 formed in the panel 106. Specifically, the panel portion 114 of the grommet 108 may be inserted axially through the opening 124. As the panel portion 114 is inserted through the opening 124, an edge of the opening 124 may engage the retention arms 126 and force the retention arms 126 to flex radially inward until the edge of the opening 124 engages the ramped surface 130 on the retention arms 226. Once the edge of the opening 124 engages the ramped surface 130, the retention arms 126 may flex radially outward to snap the grommet 108 into the opening 124. The engagement between the ramped surfaces 130 and the edge of the opening 124 prevents the grommet 108 from displacing axially relative to the opening 124 (e.g., prevents unwanted removal of the grommet 108 from the opening 124).

In the illustrated embodiment, the opening 124 includes a bulb-shaped protrusion similar in shape to the bulb 121 of the panel portion 114. During installation, the bulb 121 may be inserted into the bulb-shaped protrusions of the opening 124. The interaction between the bulb 121 and the bulb-shaped protrusion formed in the opening 124 may prevent the grommet 108 from rotating within the opening 124 after installation. In other embodiments, the bulb 121 may define an alternative shape. For example, a protrusion or recess formed in the panel portion 114 and a corresponding shape formed in the opening 124 may be used to prevent rotation of the grommet 108 after installation into the panel 106.

With the grommet 108 secured axially by the retention arms 126, the axial insertion of the grommet 108 into the opening 124 brings the primary seal 148 into engagement with the panel 106. The panel 106 and the grommet 108 may be subjected to a heat cycle to activate the adhesive in the primary seal 148. For example, in some non-limiting applications, the grommet assembly 102 may be installed on a panel in an automotive application. In this non-limiting application, a paint oven may provide heat to activate the adhesive in the primary seal 148. In some embodiments, once the primary seal 148 is activated, the primary seal 148 may be permanently attached to the panel 106 and form a seal at the interface between the panel 106 and the periphery of the grommet 108. In some embodiments, as will be described herein, the primary seal 148 may not require heat activation for form a seal between the panel 106 and the grommet 108.

With reference to FIGS. 21-33, once the grommet 108 is installed into the opening 124 of the panel 106 and sealed to the panel 106 via the primary seal 148, the subassembly including the boot 104 and the lock ring 110 may be installed to the grommet 108. Initially, the ends of the components routed through the boot 104 may be inserted through the passageway 132 formed axially through the grommet 108. The lock ring 110 may then be axially inserted over the grommet 108, so that the ring portion 118 is received within the central hub 150 of the lock ring 110. As the lock ring 110 is inserted axially onto the grommet 108, the ring alignment notch 170 on the lock ring 110 may be circumferentially aligned with the initial alignment notch 144 on the grommet 108 (see FIG. 32). This circumferential arrangement provided by aligning the ring alignment notch 170 with the initial alignment notch 144 may ensure that the grommet clamping features 138 are circumferentially offset from the ring clamping features 160, which allows the lock ring 110 to be completely inserted axially onto the grommet 108. With the lock ring 110 axially inserted over the grommet 108, the grommet clamping features 138 may be aligned to engage with the ring clamping features 160, upon rotation of the lock ring 110 relative to the grommet 108.

Figure 32:
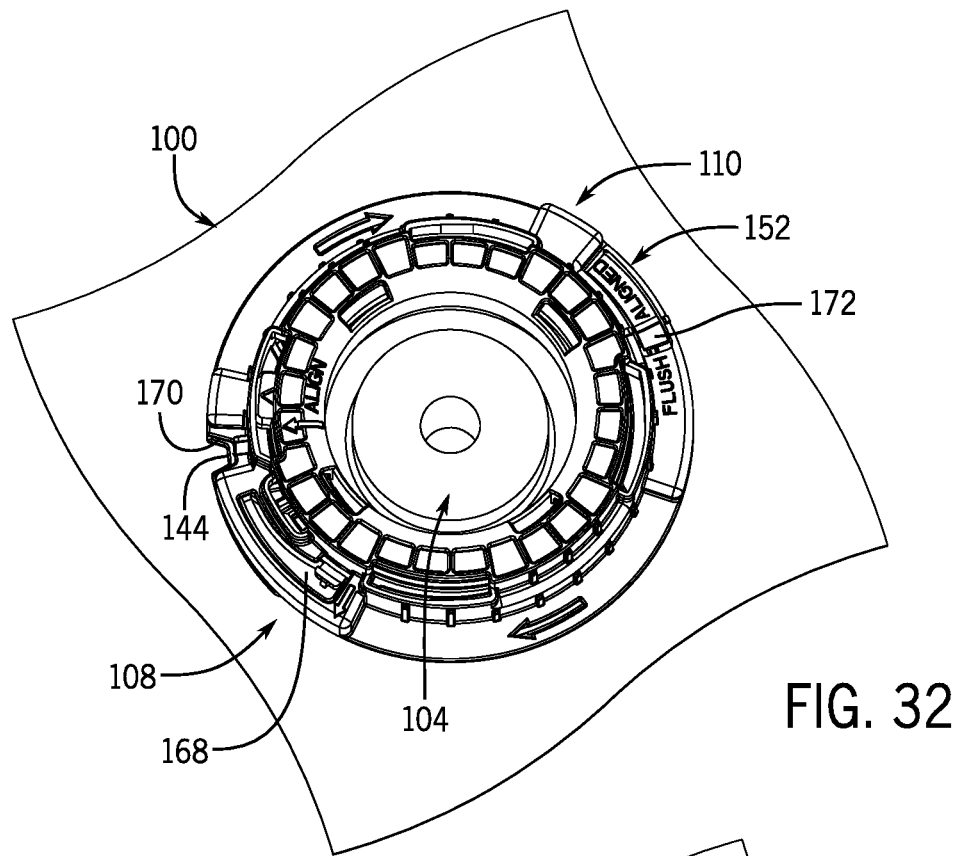
FIG. 32 is a top, front, left isometric view of the sealed pass-through grommet system of FIG. 19 with the lock ring initially installed into the grommet.
Figure 33:
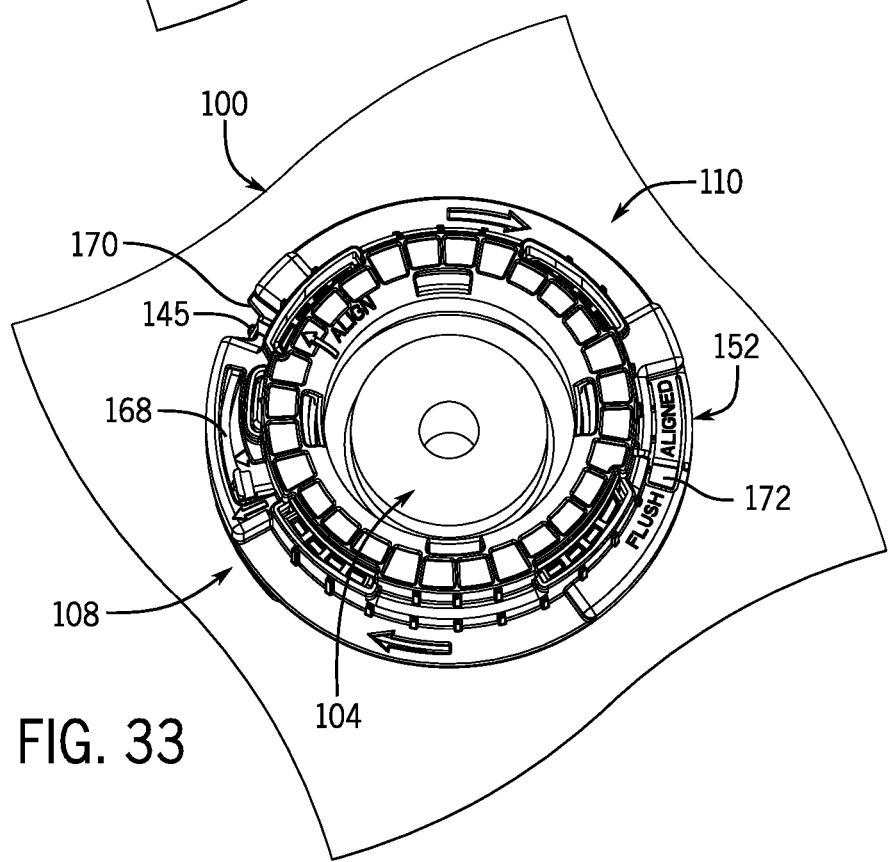
FIG. 33 is a top, front, left isometric view of the sealed pass-through grommet system of FIG. 19 with the lock ring completely rotated after assembly.

As illustrated in the transition between FIG. 32 and FIG. 33, the lock ring 110 may be rotated relative to the grommet 108 (e.g., clockwise in the illustrated embodiment). The rotation of the lock ring 110 relative to the grommet 108 brings the grommet clamping features 138 into engagement with the ring clamping features 160. Specifically, the helical surfaces 164 on the ring clamping features 160 of the lock ring 110 may engage and slide along the helical surfaces 140 on the grommet clamping features 138 of the grommet 108. Due to the helical interaction between the helical surfaces 164 and the helical surfaces 140, the relative rotation between the lock ring 110 and the grommet 108 may result in the lock ring 110 displacing axially toward the grommet 108.

As the lock ring 110 is rotated relative to the grommet 108, the verification tab 172 may provide a visual and/or audible indication that the lock ring 110 is rotating relative to the grommet 108 and, after sufficient relative rotation, completely fastened thereto. For example, as the lock ring 110 is rotated, the ramped surface 176 of the verification tab 172 may sequentially slide over the lock verification ribs 142, which axially displaces and offsets the distal end of the verification tab 172 relative to the platform 112 and the locking flange 152 (e.g., upward from the perspective of FIG. 32). As the verification tab 172 sequentially slides over the lock verification ribs 142, an audible (e.g., a click) may be heard by the user confirming that the lock ring 110 is being properly rotated relative to the grommet 108. The lock ring 110 may continue to be rotated relative to the grommet 108 until the ring alignment notch 170 circumferentially aligns with the final alignment pin 145 on the grommet 108 (see FIG. 34). Once the ring alignment notch 170 circumferentially aligns with the final alignment pin 145, the ramped surface 176 of the verification tab 172 may displace past the last of the lock verification ribs 142 and the verification tab 172 may be arranged axially flush with the locking flange 152 on the lock ring 110 (see FIG. 33). In this way, for example, the verification tab 172, the ring alignment notch 170, and the final alignment pin 145 may provide a visual indication for when the lock ring 110 is completely fastened to the grommet 108.

In general, the indication of completed fastening provided by the verification tab 172, the ring alignment notch 170, and the final alignment pin 145 represents one embodiment. In other embodiments, the lock ring 110 and/or the grommet 108 may include a flexible feature or structure, other than the verification tab 172 that may visually indicate complete assembly, for example, by changing positions once the lock ring 110 is completely fastened to the grommet 108.

In addition to the verification tab 172, the locking arm 168 may aid in rotationally locking the lock ring 110 to the grommet 108, once the lock ring 110 is completely fastened to the grommet 108. For example, the distal end of the locking arm 168 may engage the locking wedge 146 during rotation of the lock ring 110. Once the distal end of the locking arm 168 engages the locking wedge 146, the distal end of the locking arm 168 may flex radially outward until the locking surface 173 of the locking arm 168 rotationally passes the planar surface 147 of the locking wedge 146, which occurs once the lock ring 110 is completely fastened to the grommet 108. The distal end of the locking arm 168 then snaps radially inward and brings the locking surface 173 into engagement with the planar surface 147 of the locking wedge 146. In this way, for example, the locking arm 168 may prevent relative rotation between the lock ring 110 and the grommet 108 (e.g., in a counterclockwise direction in the illustrated embodiment) after the lock ring 110 is completely fastened to the grommet 108.

Figure 35:
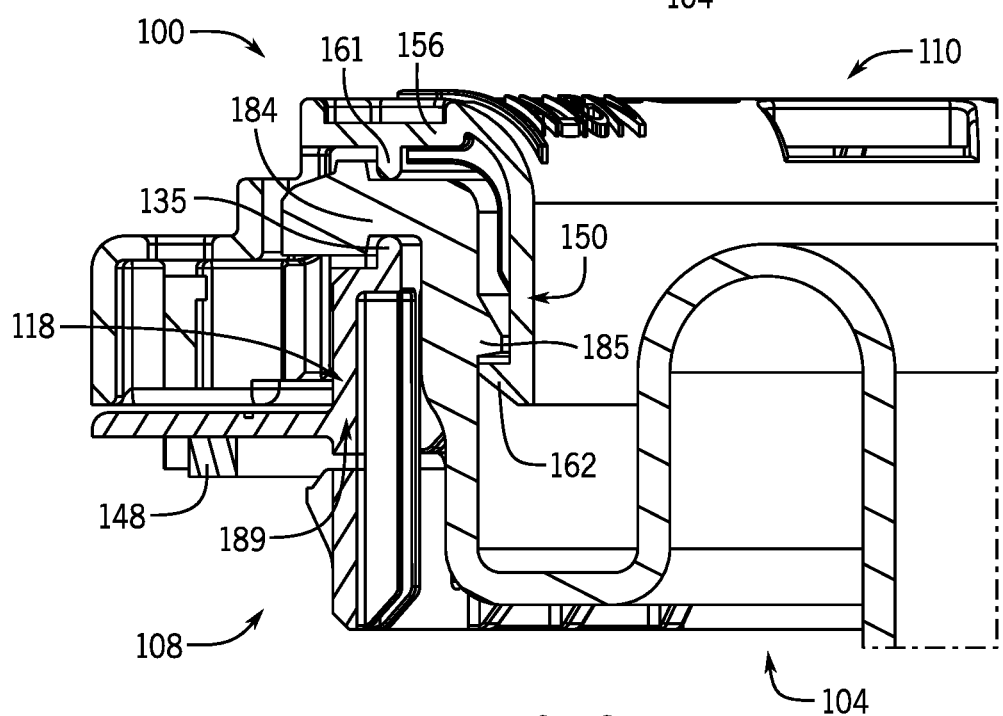
FIG. 35 is a partial cross-sectional view of the sealed pass-through grommet system of FIG. 34 taken along line 35-35.

Turning to FIG. 35, the axial displacement of the lock ring 110 toward the grommet 108 that occurs during rotation of the lock ring 110 compresses the boot flange 184 between the grommet 108 and the lock ring 110. Specifically, once the lock ring 110 is completely fastened to the grommet 108, the boot flange 184 is compressed between the grommet sealing bead 135 of the ring portion 118 on the grommet 108 and the ring sealing bead 161 of the lock ring 110. In the illustrated embodiment, the grommet sealing bead 135 of the ring portion 118 is radially aligned with the ring sealing bead 161 to aid in pinching the boot flange 184 therebetween. The compression of the boot flange 184 between the grommet 108 and the lock ring 110 forms a secondary seal 186 along the passageway 132. That is, with the lock ring 110 completely fastened to the grommet 108, the passageway 132 extends through the grommet 108, the lock ring 110, and the boot 104 and includes the primary seal 148 and the secondary seal 186 to prevent, for example, liquids (e.g., water) from entering the passageway 132 and reaching the components being routed through the grommet assembly 102 and the boot 104. In the illustrated embodiment, the secondary seal 186 is axially separated from a plane along which the primary seal 148 and is axially separated from a plane along which the opening 124 in the panel 106 is defined. In this way, for example, the secondary seal 186 raises the next possible location for leakage away from the panel 106, thereby reducing the possibility of leakage due to liquid pooling on the panel 106.

In some non-limiting applications, the grommet system 100 may be used to route components through a floor or another location on a vehicle. However, the design and properties of the grommet assembly 102 may be utilized for routing components at any location within a vehicle, for example, a tailgate, a door, a floor pan, a dash, or on a mild hybrid electric vehicle. In some non-limiting applications, the grommet assembly 102 may be used as an access point in a body of a vehicle where a seal is required when not in use. For example, the grommet assembly 102 may be used as an access point for a parking brake assembly, a fuel pump, and/or an electronic module.

Figure 36:
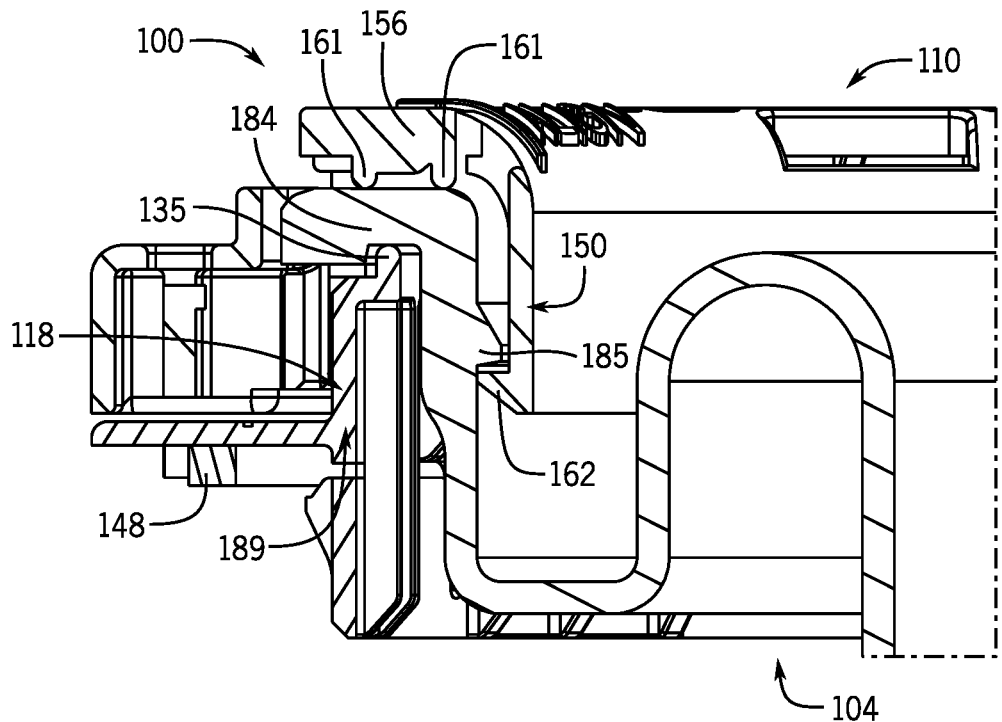
FIG. 36 is the partial cross-sectional view of FIG. 35 illustrating an alternative secondary seal contact arrangement.

In some embodiments, the grommet 108, the lock ring 110, and/or the boot 104 may be modified to provide an alternative seal contact for the secondary seal 186. For example, as illustrated in FIG. 36, the lock ring 110 may include two ring sealing beads 161 that are radially spaced from one another. When the grommet assembly 102 is assembled, the secondary seal 186 may be formed by the compression of the boot flange 184 between the grommet sealing bead 135 and the two ring sealing beads 161. The grommet sealing bead 135 may be arranged radially between the two ring sealing beads 161 to aid in bending of the boot flange 184 during compression between the lock ring 110 and the grommet 108.

Figure 37:
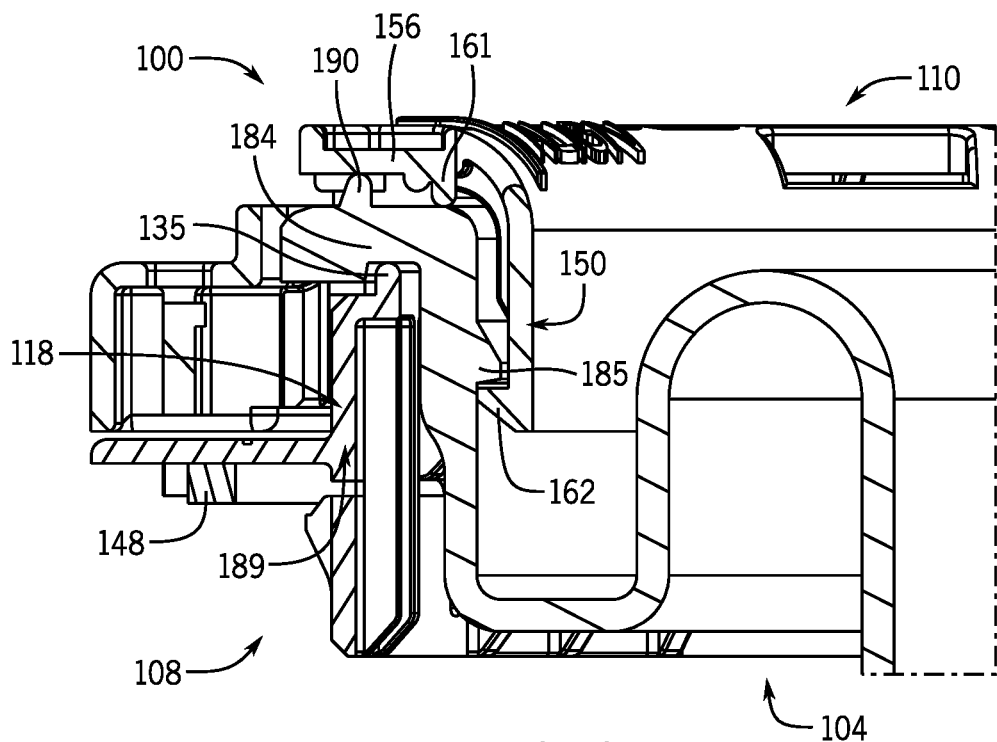
FIG. 37 is the partial cross-sectional view of FIG. 35 illustrating another alternative secondary seal contact arrangement.
Figure 38:
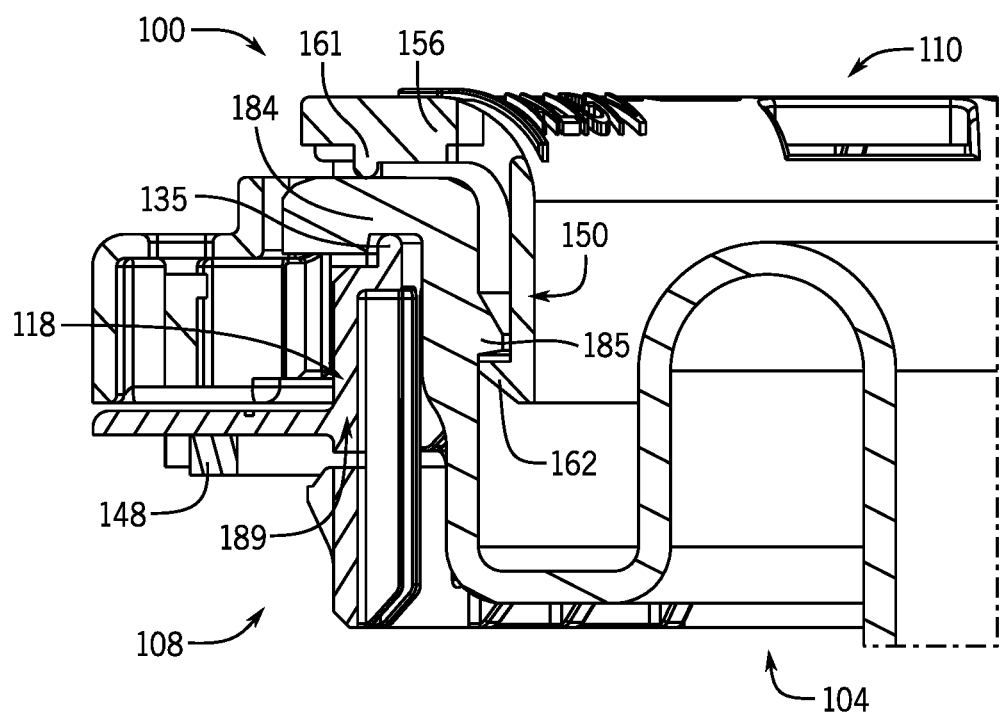
FIG. 38 is the partial cross-sectional view of FIG. 35 illustrating yet another alternative secondary seal contact arrangement.

With reference to FIG. 37, in another embodiment, the ring sealing bead 161 of the lock ring 110 may be radially offset relative to the grommet sealing bead 135 to aid in bending of the boot flange 184 during compression between the lock ring 110 and the grommet 108. In addition, the boot 104 may include a boot bead 190 that protrudes axially from the boot flange 184 (e.g., upward from the perspective of FIG. 37) and that is arranged radially outwardly relative to the grommet sealing bead 135 and the ring sealing bead 161. In another embodiment, as illustrated in FIG. 38, the boot 104 may not include the boot bead 190.

Figure 39:
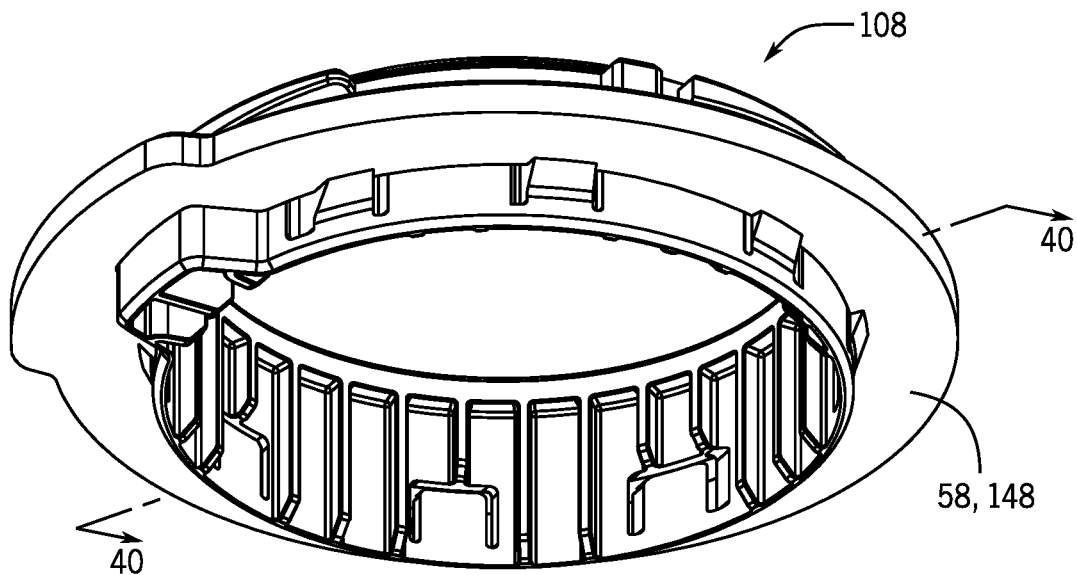
FIG. 39 is a bottom, front, left isometric view of a grommet assembled to a foam seal according to the present disclosure.
Figure 40:
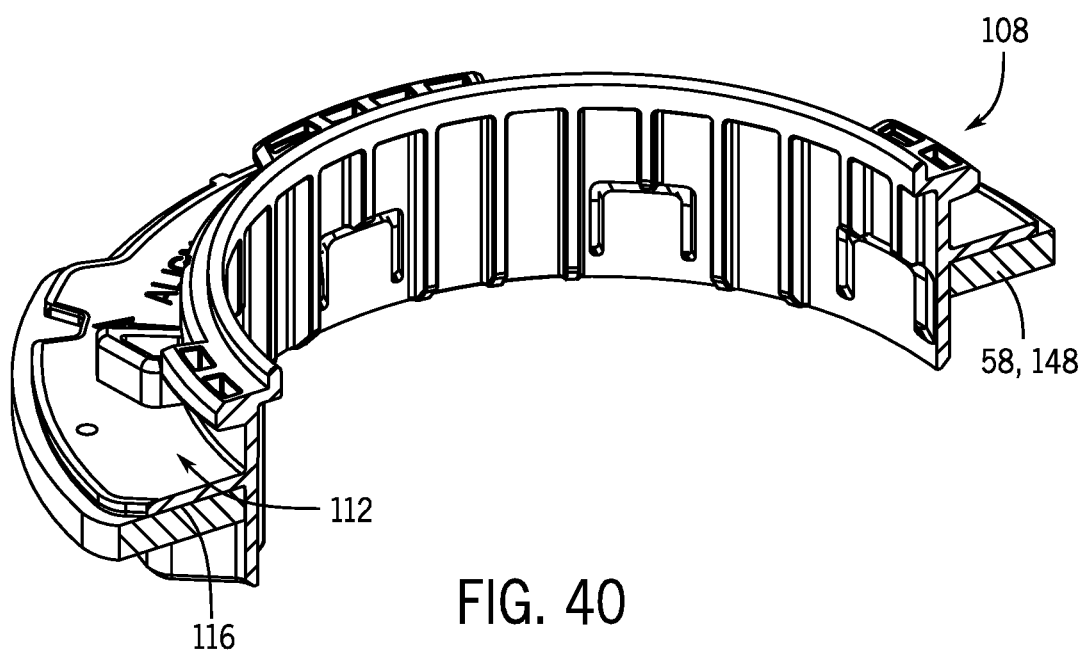
FIG. 40 is a cross-sectional view of the grommet and the foam seal of FIG. 39 taken along line 39-39.

As described herein, the primary seal 58,148 may define alternative forms. For example, as illustrated in FIGS. 39 and 40, the primary seal 58,148 may be in the form of a foam seal that extends circumferentially around a periphery of the panel portion 114 on the grommet 108, and is in engagement with the first surface 116 of the platform 112. Although the foam seal is illustrated as being installed on the grommet 108, it may be applied similarly to the grommet 18 or any other grommet designed using the properties and techniques disclosed herein.

Figure 41:
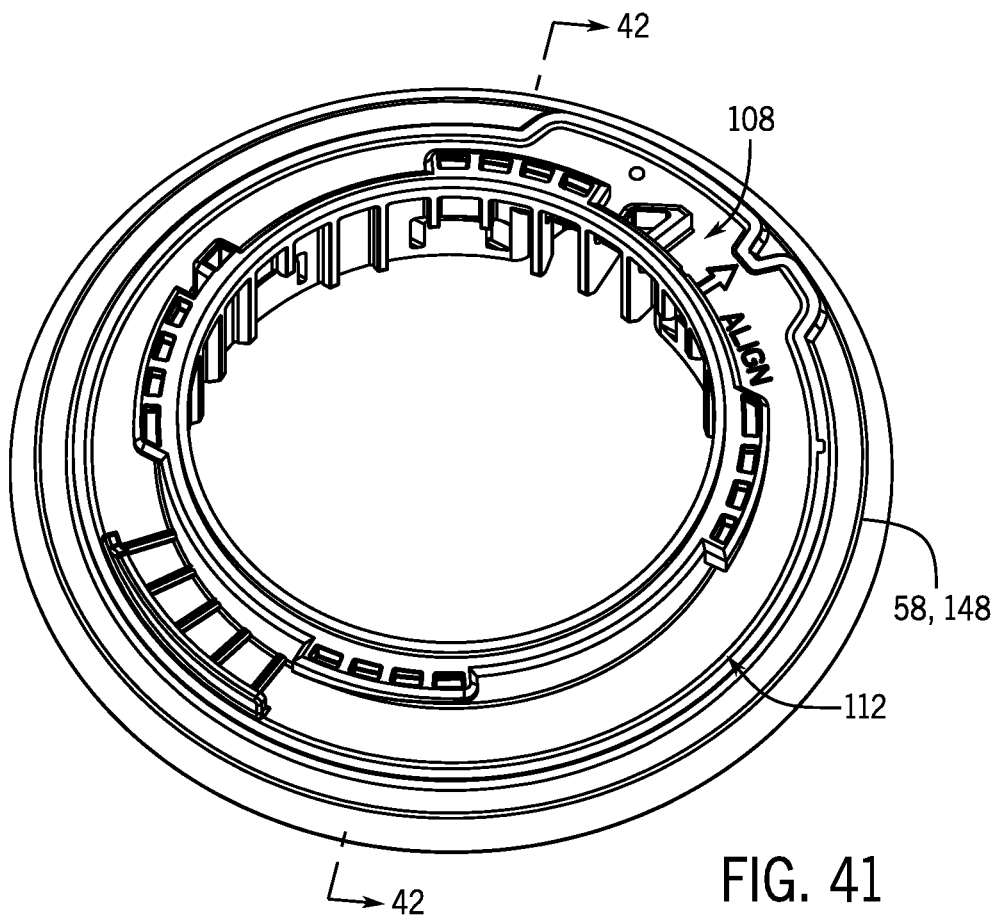
FIG. 41 is a top, front, left isometric view of a grommet assembled to a molded seal according to the present disclosure.
Figure 42:
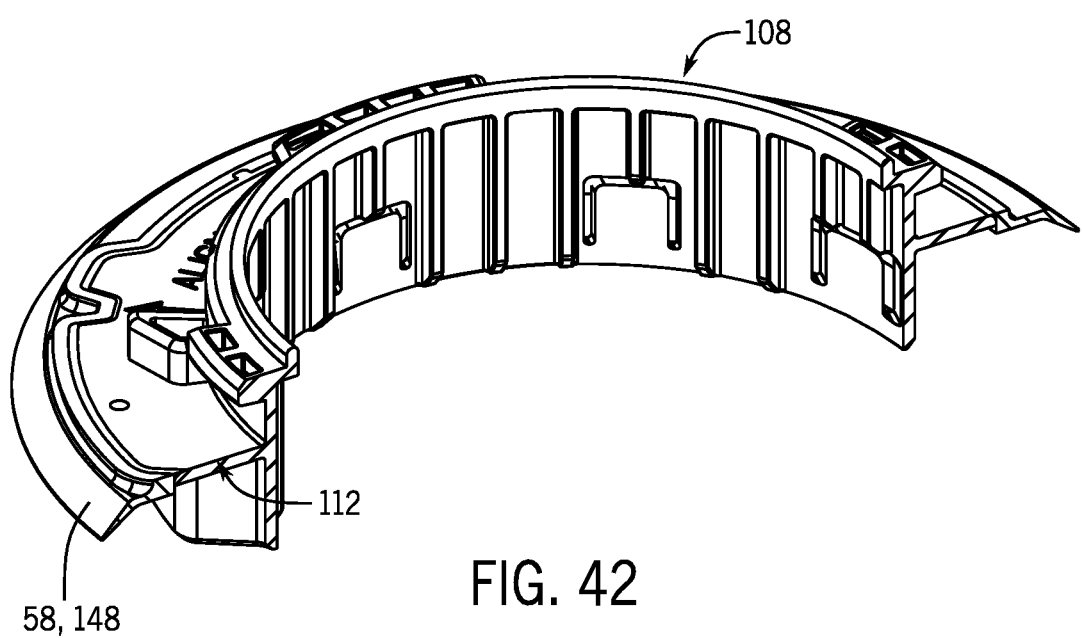
FIG. 42 is a cross-sectional view of the grommet and the molded seal of FIG. 41 taken along line 42-42.

In another embodiment, as illustrated in FIGS. 41 and 42, the primary seal 58,148 may be in the form of a thermoplastic elastomer seal that is sealed around a periphery of the platform 112 and extends radially outwardly from the periphery of the platform 112. Although the thermoplastic elastomer seal is illustrated as being installed on the grommet 108, it may be applied similarly to the grommet 18 or any other grommet designed using the properties and techniques disclosed herein.

Figure 43:
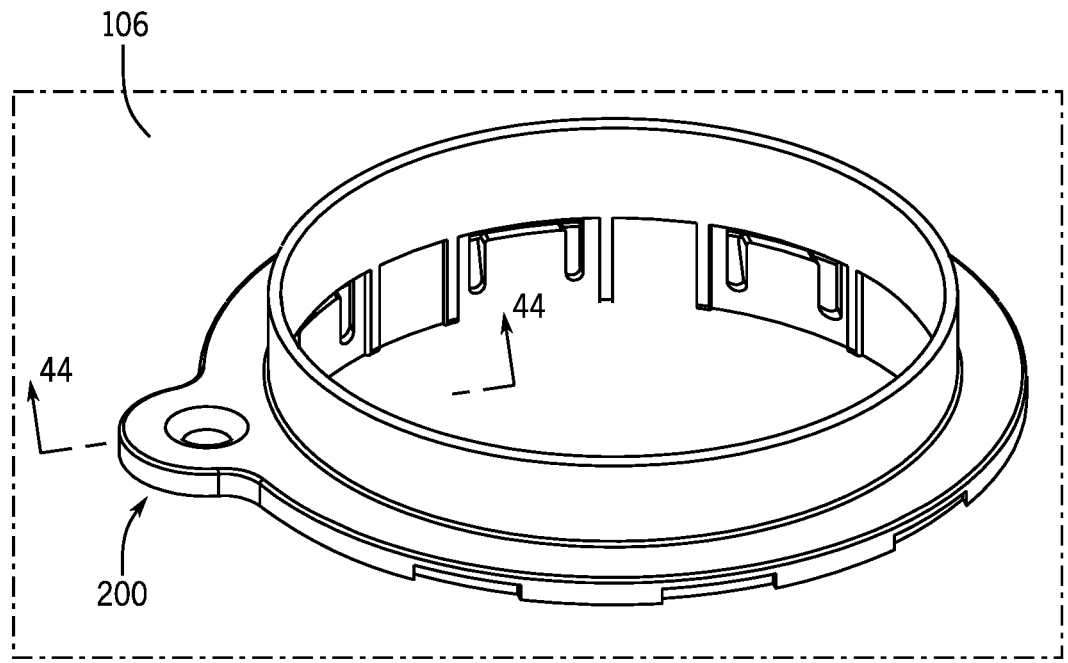
FIG. 43 is a top, front, left, isometric view of a grommet and a panel having an alternative rotational orientation control design according to the present disclosure.
Figure 44:
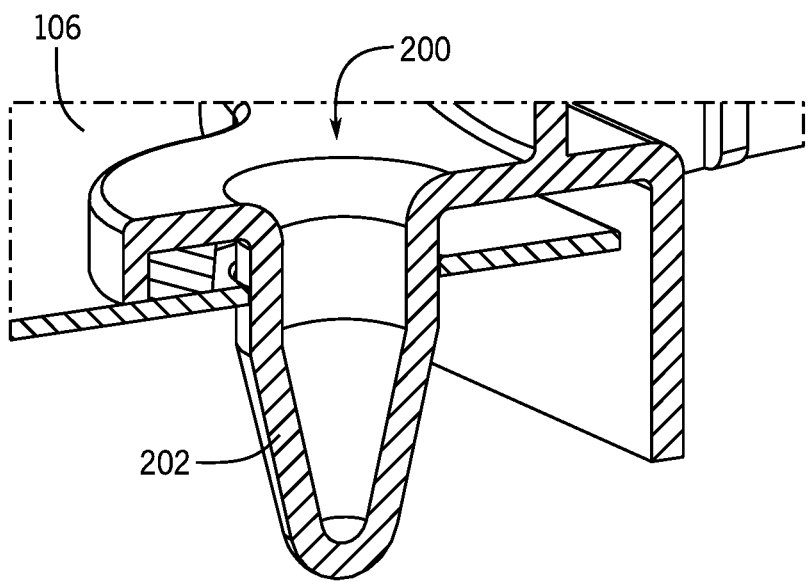
FIG. 44 is a partial cross-sectional view of the grommet and the panel of FIG. 43 taken along line 44-44.

In some embodiments, the anti-rotation geometry defined between the grommet and the panel may define alternative shapes and/or structures. For example, as illustrated in FIGS. 43 and 44, a grommet according to the present disclosure may include a pin portion 200 that extends radially outwardly from an outer periphery of the grommet. The pin portion 200 includes a pin 202 that extends axially downwardly (e.g., from the perspective of FIG. 44) and is configured to be inserted into an aperture formed in the panel 106. In this way, for example, the pin 202 may key the grommet to the panel and prevent relative rotation therebetween.

Figure 45:
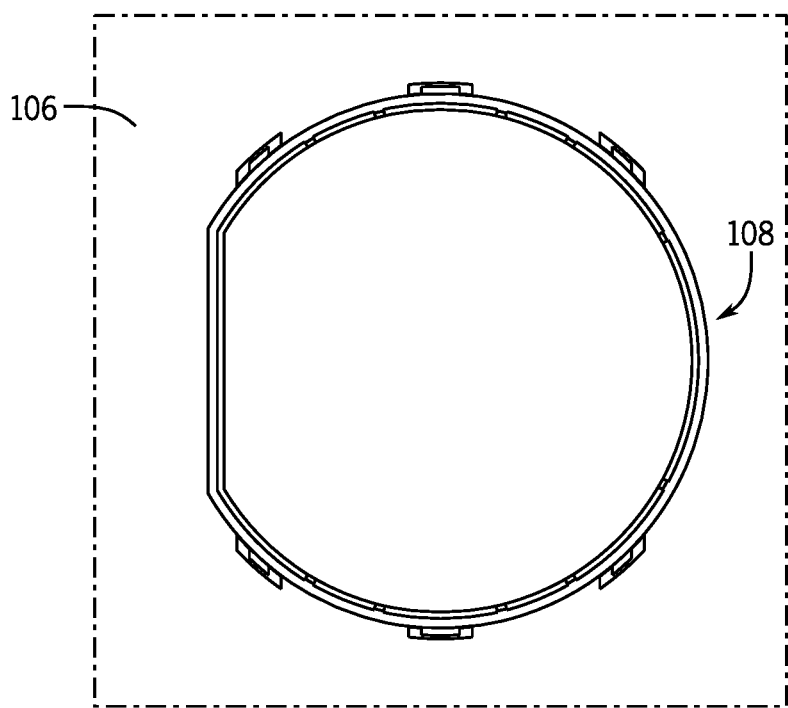
FIG. 45 is a bottom plan view of a grommet and a panel having another alternative rotational orientation control design according to the present disclosure.
Figure 46:
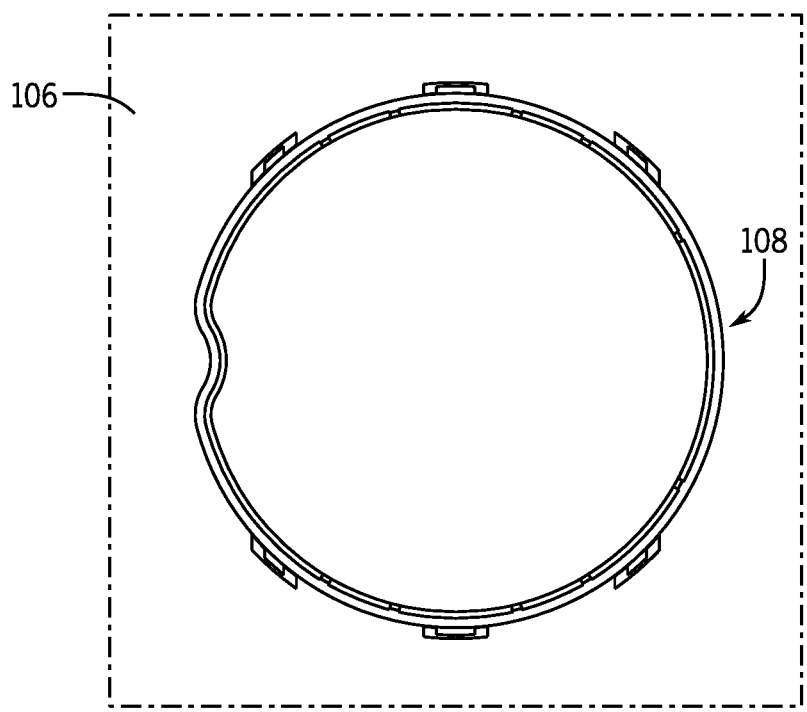
FIG. 46 is a bottom plan view of a grommet and a panel having yet another alternative rotational orientation control design according to the present disclosure.

In some embodiments, a grommet according to the present disclosure may define an alternative shape (e.g., compared to the oval shape of the grommet 18 and the bulb formed in the grommet 108). For example, as illustrated in FIG. 45, the grommet 108 may include a planar surface 204 that interrupts the generally round shape defined by the remainder of the grommet 108. Alternatively, as illustrated in FIG. 46, the grommet 108 may include a radially inwardly extending protrusion that extends circumferentially over a portion of the periphery of the grommet 108. The shapes defined by the grommets illustrated in FIGS. 45 and 46 may prevent rotation of the grommet 108 after installation into the panel 106.

In some non-limiting applications, it may be desirable to allow a grommet assembly to rotate after installation. In these non-limiting examples, the grommet and the corresponding opening formed in the panel may define a circular or round shape that allows the grommet (and the lock ring and routing element coupled thereto) to rotate relative to the panel after assembly.

Figure 47:
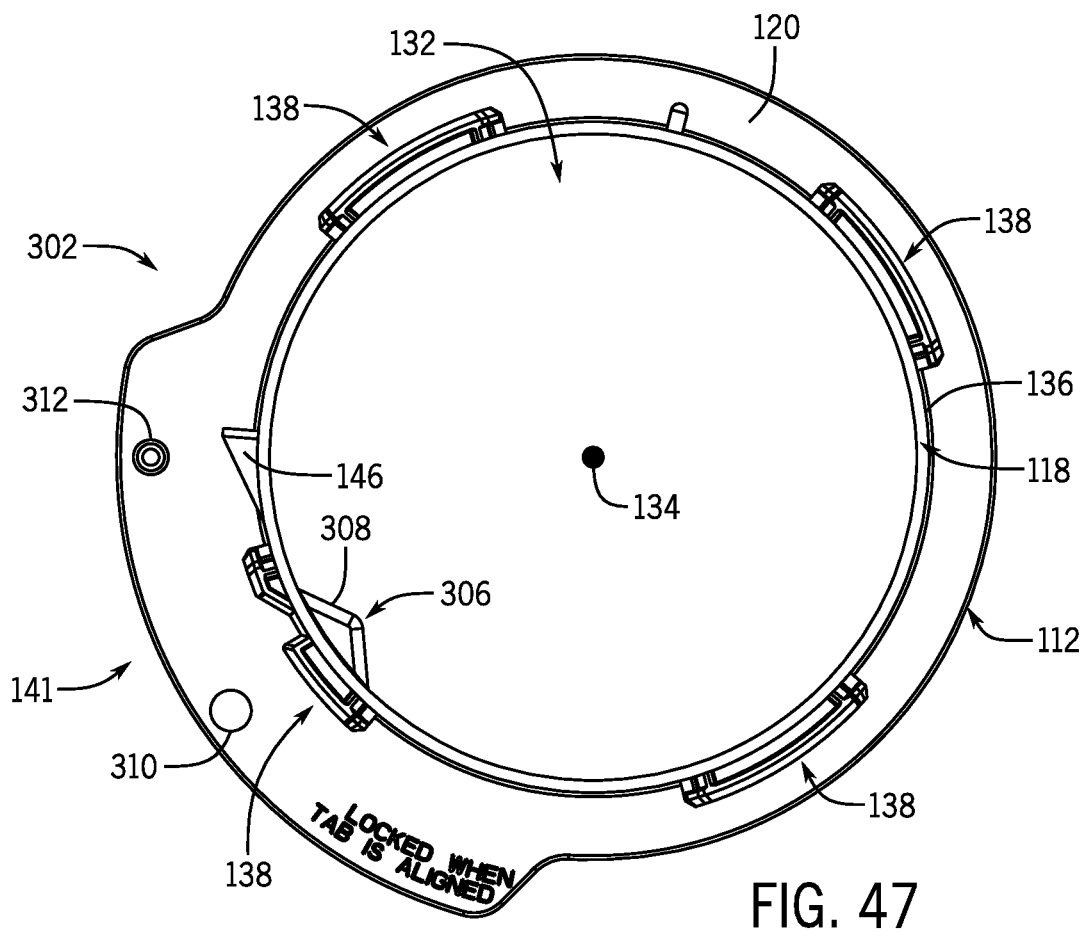
FIG. 47 is a top plan view of a grommet according to the present disclosure.

As described herein, the verification and alignment during assembly that is provided by the grommet assemblies 12 and 102 may be defined by alternative structures or mechanisms. For example, FIGS. 47-52 illustrate an alternative configuration for a grommet assembly 300 that includes a boot 301, a grommet 302, and a lock ring 304. The design and properties of the boot 301, the grommet 302, and the lock ring 304 may be similar to the boot 104, the grommet 108, and the lock ring 110, respectively, with similar features identified using like reference numerals, except as described below or as illustrated by the figures. As illustrated in FIG. 47, the grommet 302 may include a boot alignment feature 306 that is configured to align and engage with a corresponding feature on the boot 301. In the illustrated embodiment, the boot alignment feature 306 is in the form of an alignment wedge 308 that protrudes radially inwardly from the inner surface of the ring portion 118. In other words, the alignment wedge 308 protrudes radially into the passageway 132 formed through the grommet 302. In addition, the platform 112 includes a lock-verification aperture 310 and a grommet alignment aperture 312. The lock-verification aperture 310 and the grommet alignment aperture 312 are circumferentially separated and arranged adjacent to a periphery of the flanged portion 141. The alignment wedge 308 may be rotationally aligned with the lock-verification aperture 310 to provide an indication to a user or an automated machine of where the alignment wedge 308 is located on the grommet 302.

Figure 48:
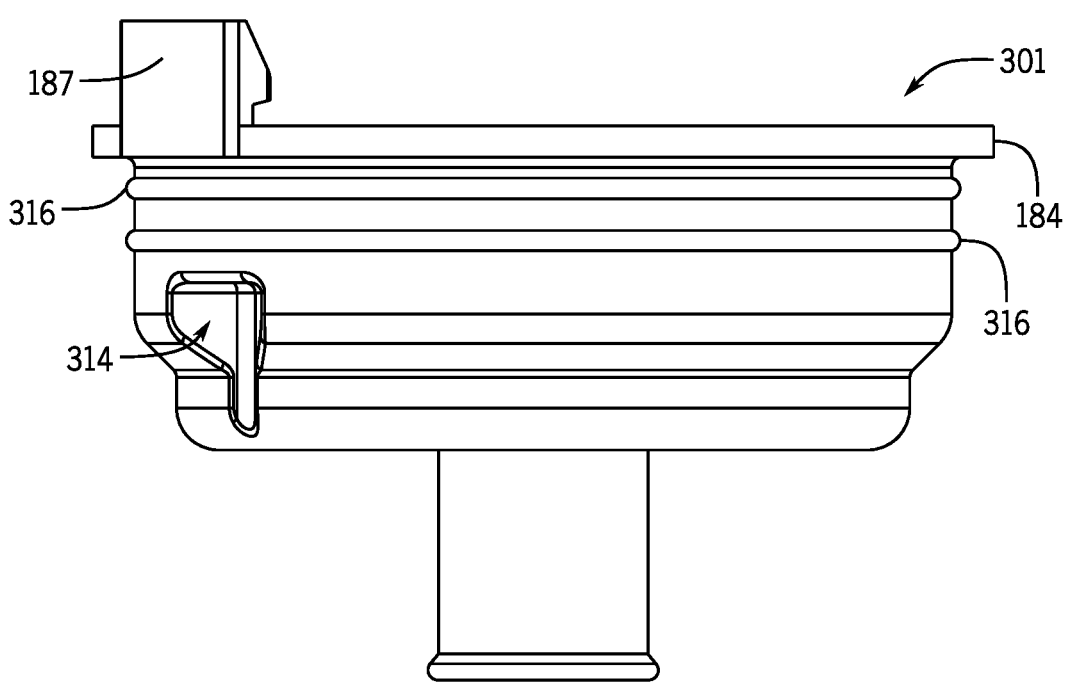
FIG. 48 is a front view of a routing element configured to be installed within the grommet of FIG. 47.
Figure 49:
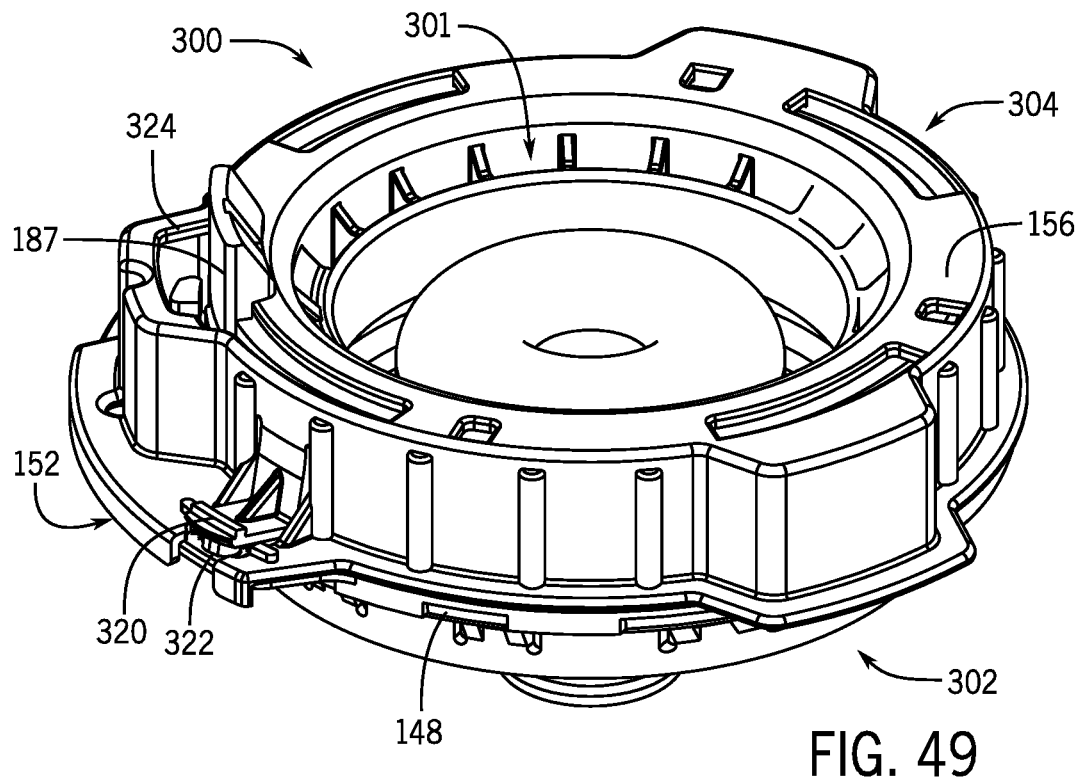
FIG. 49 is a top, front, left isometric view of a sealed pass-through grommet system using the grommet of FIG. 47 and the lock ring of FIG. 48 with the lock ring partially rotated.
Figure 50:
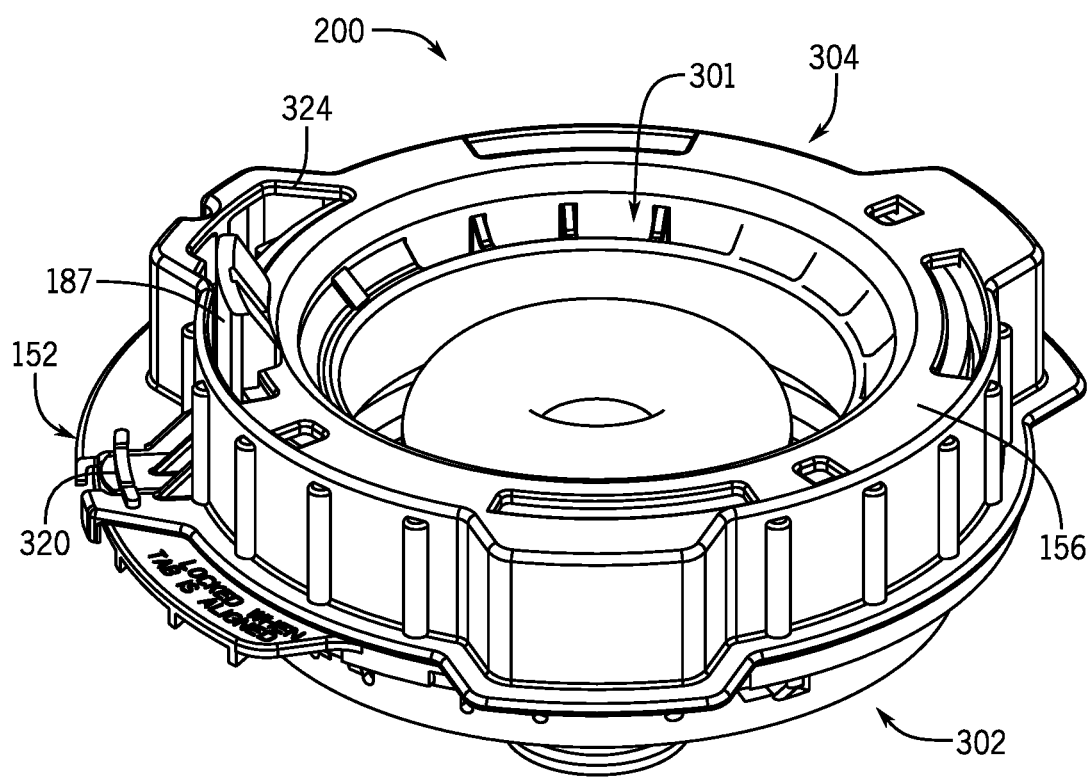
FIG. 50 is a top, front, left isometric view of the sealed pass-through grommet system using of FIG. 49 with the lock ring completely rotated after assembly.

With reference to FIG. 48, the boot 301 may include an alignment feature 314 that is configured to engage the boot alignment feature 306 in a keyed relationship to prevent relative rotation between the boot 301 and the grommet 302 during assembly. In the illustrated embodiment, the alignment feature 314 defines a wedged recess formed in the outer periphery of the boot 301. The shape and size of the wedged recess defined by the alignment feature 314 conforms to the size and shape of the alignment wedge 308 on the grommet 302. In this way, for example, once the alignment wedge 308 is received within the alignment feature 314, the boot 301 may be keyed to the grommet 302 and be prevented from rotating relative to the grommet 302.

In the embodiment of FIG. 48, the boot alignment tab 187 may extend axially away from the boot flange 184 (e.g., upward from the perspective of FIG. 48). In addition, the boot 301 may include one or more boot beads 316 extending circumferentially around an outer surface of the boot 104.

With reference to FIGS. 49-52, the lock ring 304 may include an alignment aperture 318 extending axially at least partially through the locking flange 152 at a location adjacent to the outer periphery of the locking flange 152. In addition, the lock ring 304 may include a verification tab 320 that is circumferentially separated from the alignment aperture 318. One edge of the verification tab 320 is attached to the central hub 150 adjacent to the locking flange 152 and a pair of slots are arranged on opposing sides of the verification tab 172. In this way, for example, a distal end of the verification tab 320 may be in a free-floating arrangement, which enables the distal end of the verification tab 320 to flex in an axial direction. The distal end of the verification tab 320 may include a pin 322 that protrudes axially away from (e.g., downward from the perspective of FIG. 49) a bottom surface of the verification tab 320. An aperture 324 may be formed in the top wall 156 of the central hub 150, which circumferentially aligns with the locking flange 152.

When the boot 301 is assembled to the lock ring 304, the boot alignment tab 187 extends through the aperture 324 formed in the top wall 256. With the boot 301 installed into the lock ring 304, the boot alignment tab 187 may extend over a portion of the top wall 156 to act as a stop and prevent axial displacement of the boot 104, for example, in a downward direction from the perspective of FIGS. 49 and 50.

Once the boot 301 is assembled to the lock ring 304, the lock ring 304 and the boot 301 may be inserted axially onto the grommet 302, which may be inserted into a panel in accordance with the grommets described herein. Once the lock ring 304 is installed onto the grommet 302, the lock ring 304 may be rotated relative to the grommet 302 to fasten the lock ring 304 to the grommet 302, which may compress the boot 301 between the grommet 302 and the lock ring 304. As the lock ring 304 is rotated, the pin 322 on the verification tab 320 may initially engage the flanged portion 141 of the grommet 302, which axially displaces and offsets the distal end of the verification tab 320 relative to the platform 112 and the locking flange 152 (e.g., upward from the perspective of FIG. 49). The verification tab 320 may remain axially offset from the locking flange 152 until the lock ring 304 is rotated to a point where the pin 322 rotationally aligns with the lock-verification aperture 310. Once the pin 322 aligns with the lock-verification aperture 310, the distal end of the verification tab 320 displaces axially relative to the locking flange 152 and becomes axially flush or aligned with the locking flange 152. In this way, for example, the verification tab 320 may provide a visual indication for when the lock ring 304 is completely fastened to the grommet 302. In addition, the verification tab 320 may provide an audible indication that occurs when the pin 322 snaps into the lock-verification aperture 310. Furthermore, the pin 322 extending axially into the lock-verification aperture 310 may aid in preventing the lock ring 304 from displacing rotationally relative to the grommet 302.

Figure 51:
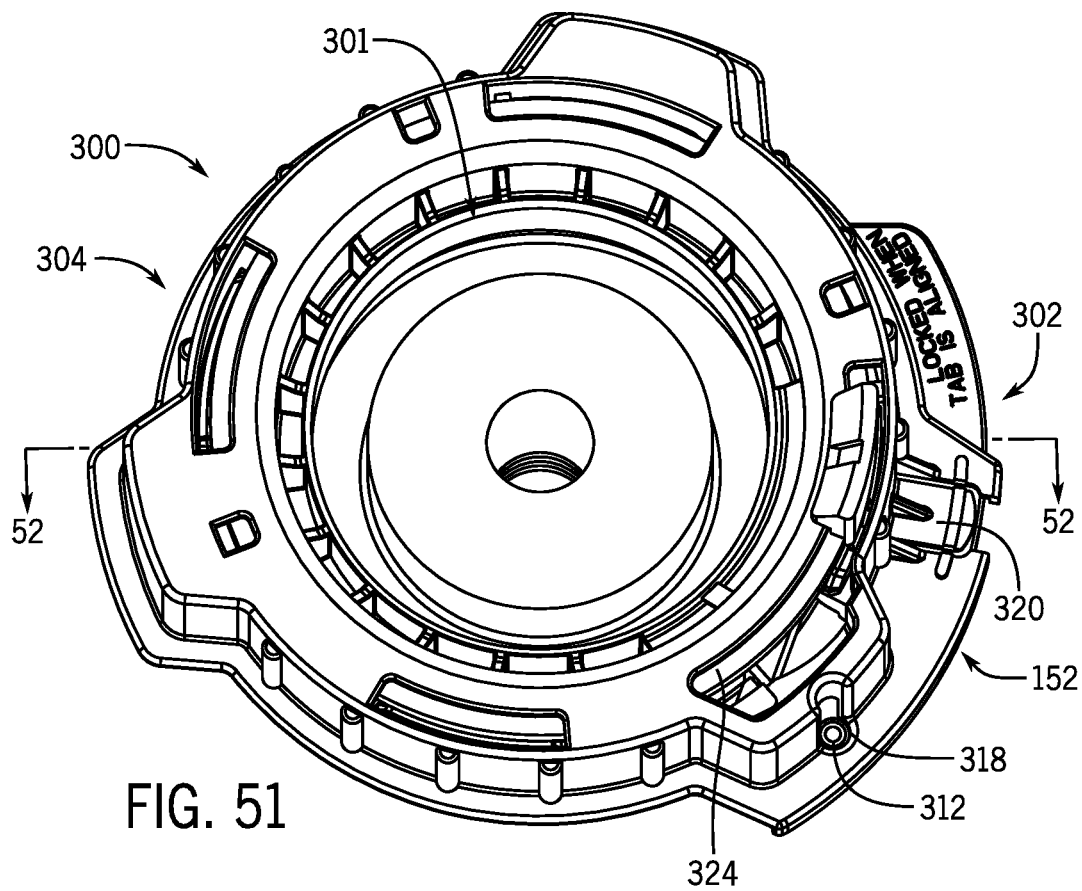
FIG. 51 is a top view of the sealed pass-through grommet system of FIG. 49.

In addition to the verification tab 320, the grommet alignment aperture 312 may provide an additional visual indication that the lock ring 304 is completely fastened to the grommet 302. For example, as illustrated in the sequence of FIG. 51, once the lock ring 304 is completely fastened to the grommet 302, the alignment aperture 318 rotationally aligns with the grommet alignment aperture 312, thereby providing another visual indication that the lock ring 304 is completely fastened to the grommet 302.

Figure 52:
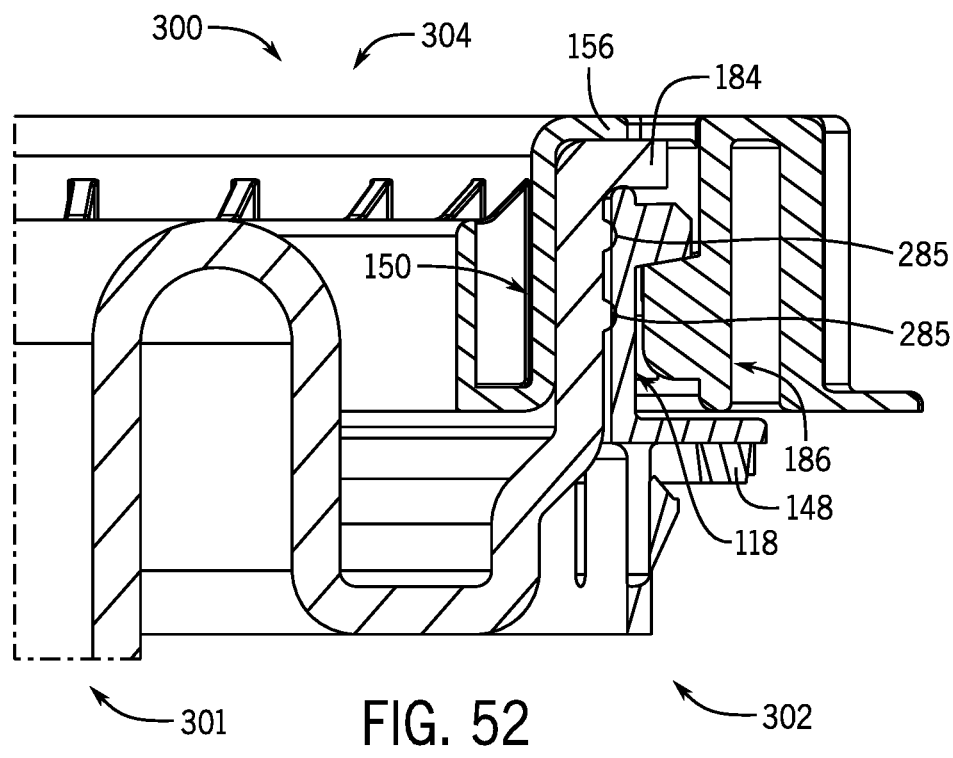
FIG. 52 is a partial cross-sectional view of the sealed pass-through grommet system of FIG. 49 taken along line 52-52.

With reference to FIG. 52, the axial displacement of the lock ring 304 toward the grommet 302 that occurs during rotation of the lock ring 304 compresses the boot flange 184 and the boot beads 316 between the grommet 302 and the lock ring 304. As such, once the lock ring 304 is completely fastened to the grommet 302, the boot flange 184 is compressed between the ring portion 118 of the grommet 302 and the top wall 156 of the lock ring 304. In addition, the boot beads 316 may be compressed between the central hub 152 and the inner side of the ring portion 118. The compression of the boot flange 184 and the boot beads 316 forms the secondary seal 186 along the passageway 132. That is, with the lock ring 304 completely fastened to the grommet 302, the passageway 232 extends through the grommet 302, the lock ring 304, and the boot 301 and includes the primary seal 148 and the secondary seal 186 to prevent, for example, liquids (e.g., water) from entering the passageway 132 and reaching the components being routed through the boot 301.

It should be appreciated that alternative mechanisms may be leveraged for inserting and retaining a grommet within a panel than those disclosed herein. For example, the hole plug retention mechanism disclosed in U.S. Published Patent Application No. 2019/0360587 and U.S. Published Patent Application No. 2019/0211929, which are incorporated by reference in their entirety, may be integrated in addition to or alternatively to the grommet retention features described herein.

The design and properties of the grommet assemblies 12, 102, and 300 provide several advantages over conventional grommet systems. For example, the formation of a primary seal and the fastening between a grommet and a lock ring are separated. That is, the primary seal is formed during a heat cycle and, therefore, is not dependent on the fastening between the grommet and the lock ring. In addition, the arrangement of the primary seal at an interface between a panel and the grommet arranges the primary seal at the most important location for leakage prevention. Further, arranging the primary seal around the periphery of the grommet reduces the footprint required by the grommet on the panel, which reduces the overall packaging size of the grommet assembly.

In addition to the primary seal, a secondary seal is formed during the fastening of the lock ring to the grommet. The secondary seal is axially separated from the primary seal and is axially separated from a plane along which an opening in the panel is defined. In this way, for example, the secondary seal raises the next possible location for leakage away from the panel, thereby reducing the possibility of leakage due to liquid pooling on the panel. Further, the fastening between the lock ring and the grommet is significantly simplified (i.e., rotation of the lock ring) when compared to conventional grommet system that require a substantial amount of force for assembly. The grommet assemblies 12, 102, and 300 also provide an indication that the lock ring has been properly and completely assembled to the grommet ensuring that the secondary seal is formed.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A grommet assembly configured to be installed within an opening, the grommet assembly comprising:
a grommet including a platform, a panel portion extending from a first surface of the platform, and a ring portion extending from a second surface of the platform opposite of the panel portion and having an outer surface, wherein the ring portion defines a passageway having a center axis, the ring portion including a plurality of grommet clamping features arranged circumferentially around the outer surface of the ring portion and defining helical surfaces, and wherein the panel portion includes a plurality of retention arms arranged partially within a cutout, the cutout disposed circumferentially around the panel portion and extending radially outward away from the center axis;

a primary seal extending around a periphery of the grommet; and a lock ring including a central hub having a plurality of ring clamping features arranged around the central hub, wherein selective displacement of the lock ring relative to the grommet is configured to engage each one of the plurality of ring clamping features with a corresponding one of the plurality of grommet clamping features to fasten the lock ring to the grommet and form a secondary seal between the grommet and the lock ring.

2. The grommet assembly of claim 1, further comprising a routing element at least partially arranged within the central hub of the lock ring.

3. The grommet assembly of claim 2, wherein selective displacement of the lock ring relative to grommet is configured to compress a flange or a sealing bead of the routing element between the grommet and the lock ring to form the secondary seal.

4. The grommet assembly of claim 3, wherein the secondary seal is axially separated from a plane along which the primary seal is defined.

5. The grommet assembly of claim 1, wherein the plurality of retention arms are configured to selective engage the opening and retain the grommet within the opening.

6. The grommet assembly of claim 5, wherein the panel portion includes one or more panel retention features, the one or more panel retention features each include the plurality of retention arms that are arranged on and around the panel portion, and wherein the plurality of retention arms are flexible relative to the panel portion and configured to, upon insertion of the panel portion into the opening, flex inwardly and then outwardly to snap the grommet into the opening and inhibit the grommet from displacing axially relative to the opening.

7. The grommet assembly of claim 1, wherein the plurality of ring clamping features are arranged circumferentially around an inner surface of the central hub, and wherein each of the plurality of ring clamping features extends radially inward from the inner surface and is angled helically relative to a center axis extending through the passageway.

8. The grommet assembly of claim 7, wherein selective rotation of the lock ring relative to the grommet engages each one of the plurality of ring clamping features with a corresponding one of the plurality of grommet clamping features, and a helical angle of the plurality of ring clamping features and the plurality of grommet clamping features displaces the lock ring axially toward the grommet.

9. The grommet assembly of claim 1, wherein the grommet includes a lock verification pin and the lock ring includes a lock verification notch, and wherein alignment of the lock verification pin and the lock verification notch provides an indication that the lock ring is fastened to the grommet.

10. The grommet assembly of claim 1, wherein the lock ring includes a verification tab that is flexible relative to a locking flange defined by the lock ring, and wherein the verification tab is configured to flex relative to the locking flange during displacement of the lock ring relative to the grommet to provide an indication that the lock ring is fastened to the grommet.

11. The grommet assembly of claim 1, wherein the lock ring includes a lock arm that is flexible relative to the central hub and the grommet includes a locking protrusion extending radially outwardly from an outer surface of the ring portion, and wherein the lock arm is configured to, upon displacement of the lock ring relative to the grommet, flex outward relative to the central hub and then flex inward relative to the central hub and snap into engagement with the locking protrusion to prevent relative rotation between the lock ring and the grommet.

12. A grommet assembly configured to be installed within an opening, the grommet assembly comprising:

a grommet including a platform, a panel portion extending from a first surface of the platform, and a ring portion extending from a second surface of the platform and having an outer surface, wherein a protrusion is arranged on and extends from the first surface of the platform, wherein the panel portion includes a plurality of retention arms arranged partially within a cutout, the cutout disposed circumferentially around the panel portion, and wherein the ring portion defines a passageway having a center axis and includes a plurality of grommet clamping features arranged circumferentially around the outer surface of the ring portion and extending radially outward away from the center axis;

a primary seal extending around a periphery of the grommet; and a lock ring including a locking flange or tab and a central hub having a plurality of ring clamping features arranged around the central hub, wherein selective displacement of the lock ring relative to the grommet is configured to engage each one of the plurality of ring clamping features with a corresponding one of the plurality of grommet clamping features to fasten the lock ring to the grommet and form a secondary seal between the grommet and the lock ring, and wherein the locking flange or tab is configured to, upon displacement of the lock ring relative to the grommet, flex relative to the platform to provide an indication that the lock ring is fastened to the grommet.

13. The grommet assembly of claim 12, further comprising a routing element at least partially arranged within the central hub of the lock ring.

14. The grommet assembly of claim 13, wherein selective displacement of the lock ring relative to grommet is configured to compress a flange or a sealing bead of the routing element between the grommet and the lock ring to form the secondary seal.

15. The grommet assembly of claim 14, wherein the secondary seal is axially separated from a plane along which the primary seal is defined.

16. The grommet assembly of claim 12, wherein the grommet includes a lock verification pin and the lock ring includes a lock verification notch, and wherein alignment of the lock verification pin and the lock verification notch provides an indication that the lock ring is fastened to the grommet.

17. The grommet assembly of claim 12, wherein the lock ring includes a lock arm that is flexible relative to the central hub and the grommet includes a locking protrusion extending radially outwardly from an outer surface of the ring portion, and wherein the lock arm is configured to, upon displacement of the lock ring relative to the grommet, flex outward relative to the central hub and then flex inward relative to the central hub and snap into engagement with the locking protrusion to prevent relative rotation between the lock ring and the grommet.

18. The grommet assembly of claim 12, wherein selective rotation of the lock ring relative to the grommet displaces the lock ring axially toward the grommet due to helical engagement between the plurality of ring clamping features and the plurality of grommet clamping features.

19. The grommet assembly of claim 12, wherein the panel portion includes the plurality of retention arms configured to selective engage the opening and retain the grommet within the opening, and wherein the plurality of retention arms are flexible relative to the panel portion and configured to, upon insertion of the panel portion into the opening, flex inwardly and then outwardly to snap the grommet into the opening and inhibit the grommet from displacing axially relative to the opening.

\* \* \* \* \*